May 24, 1955

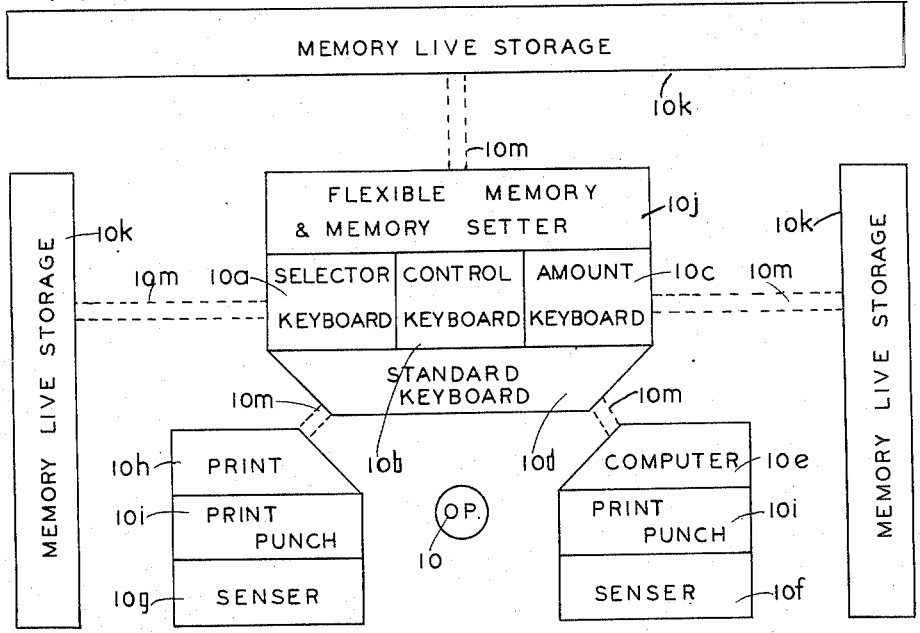

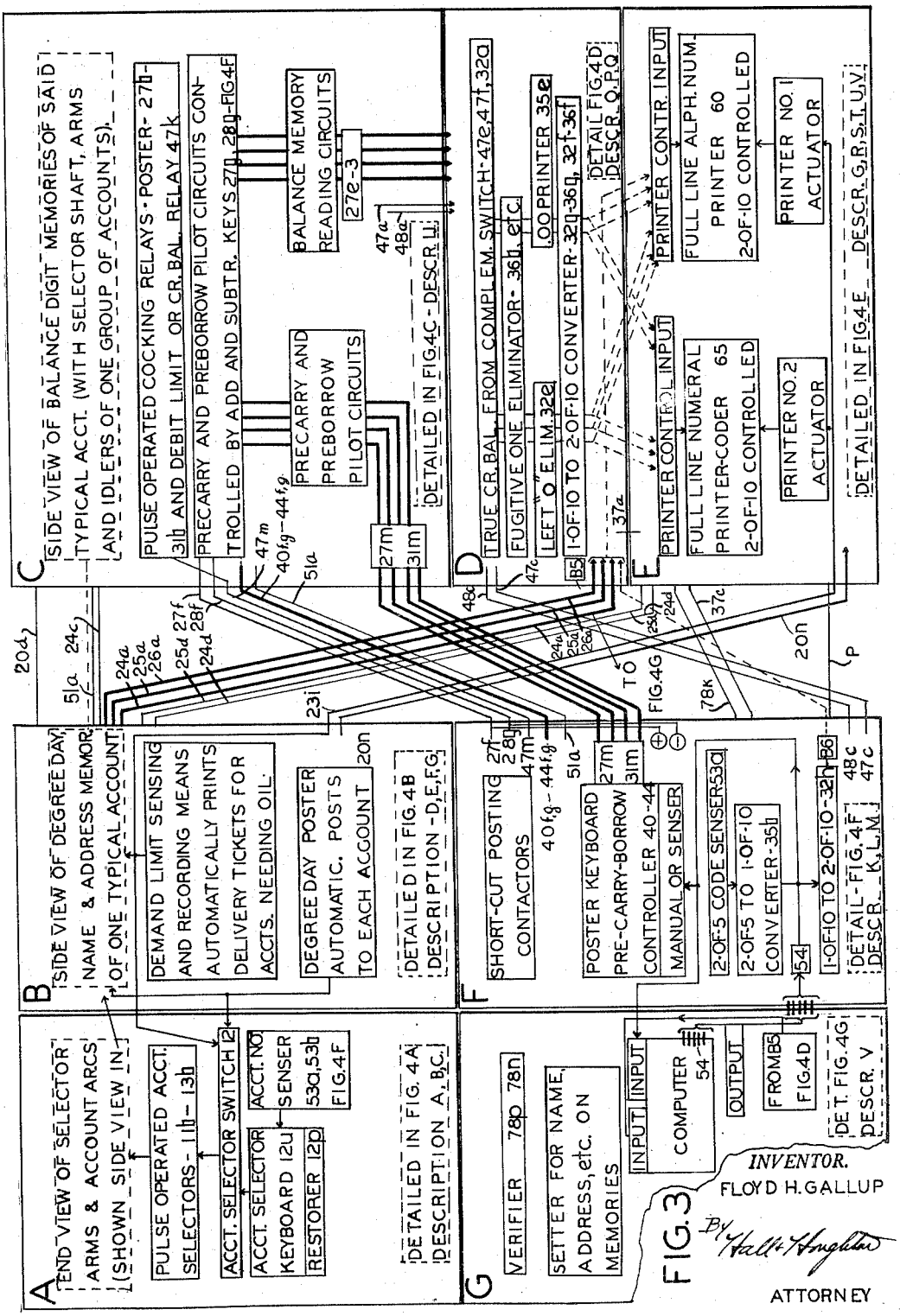

F. H. GALLUP 2,709,041

CONTINUOUS RECORD BUSINESS MACHINES

Filed May 25, 1948

INVENTOR.
FLOYD H. GALLUP

BY *Hall & Houghton*

ATTORNEY

FIG.4C

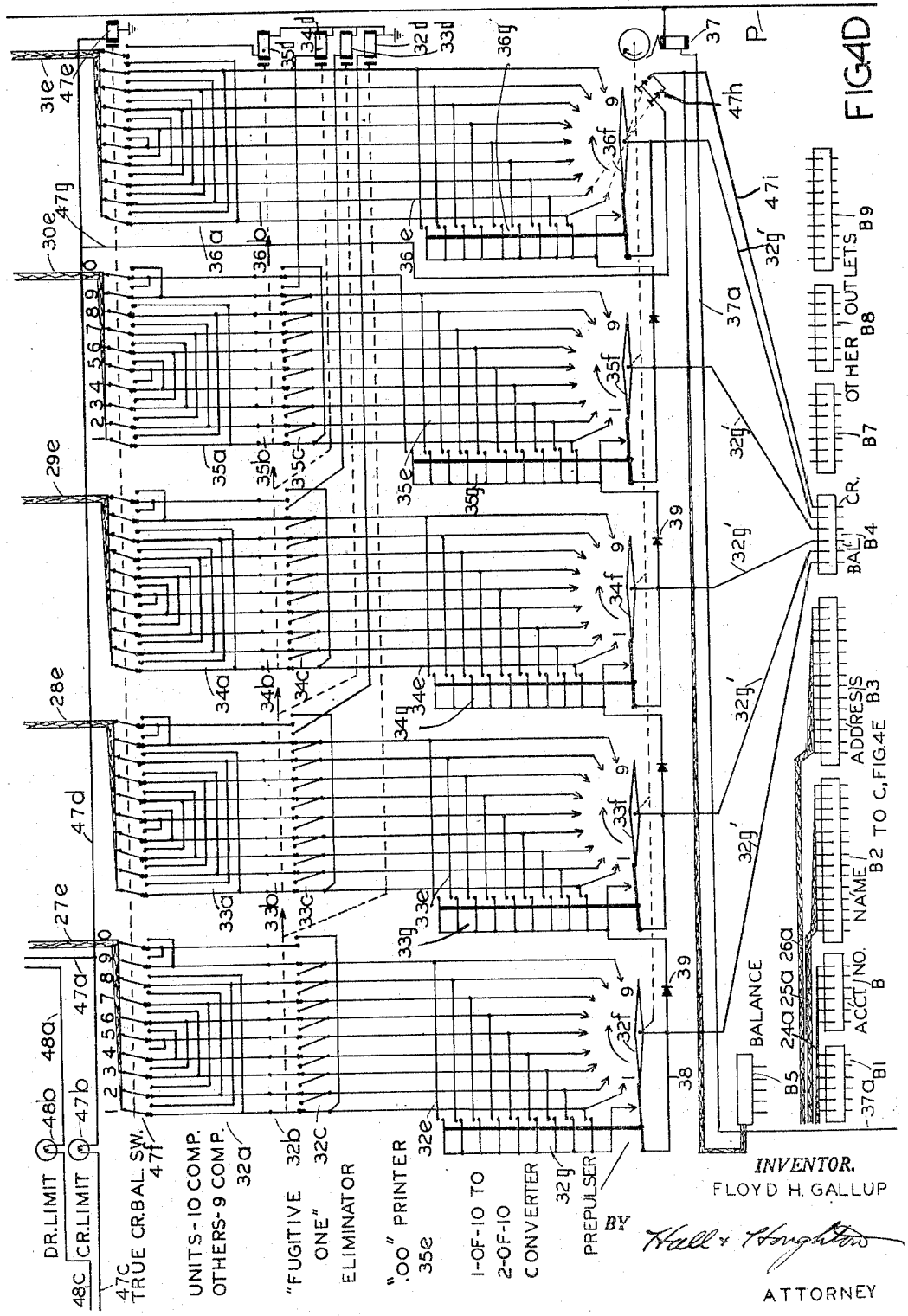

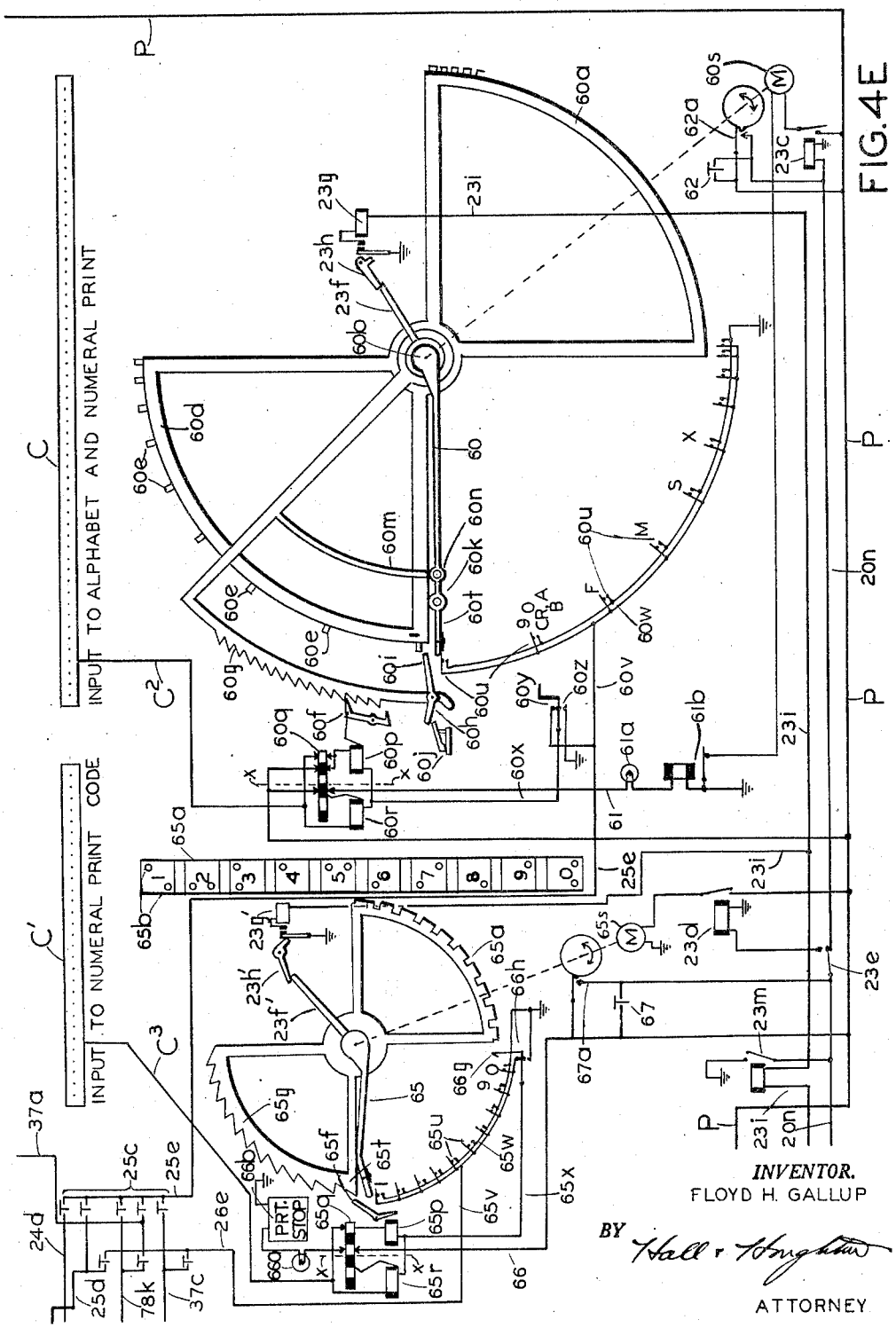

INVENTOR.
FLOYD H. GALLUP
ATTORNEY

May 24, 1955  F. H. GALLUP  2,709,041
CONTINUOUS RECORD BUSINESS MACHINES
Filed May 25, 1948  10 Sheets-Sheet 9
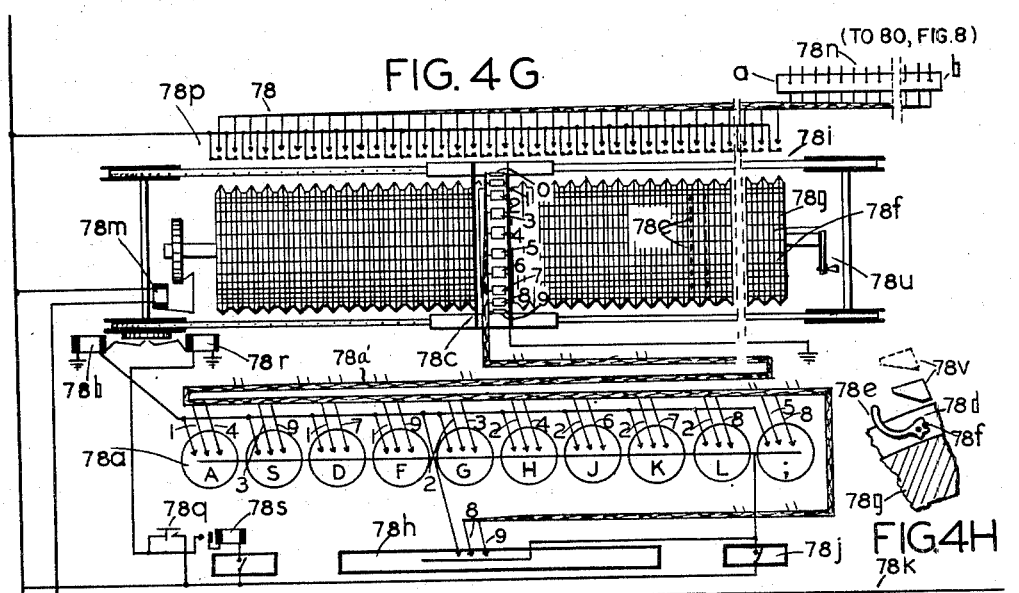
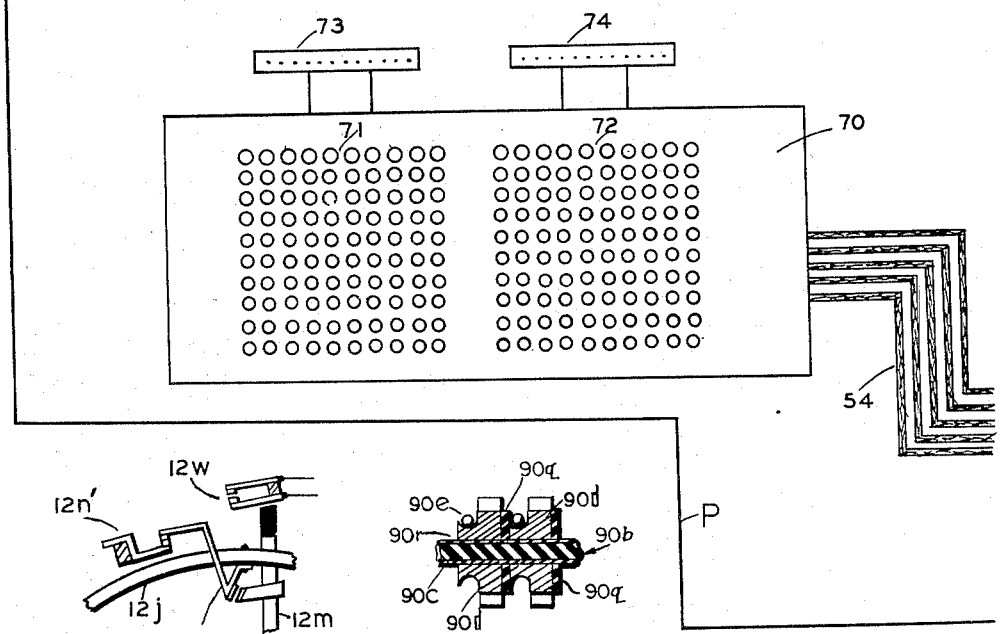
*INVENTOR.*
FLOYD H. GALLUP
BY Hall & Houghton
ATTORNEY

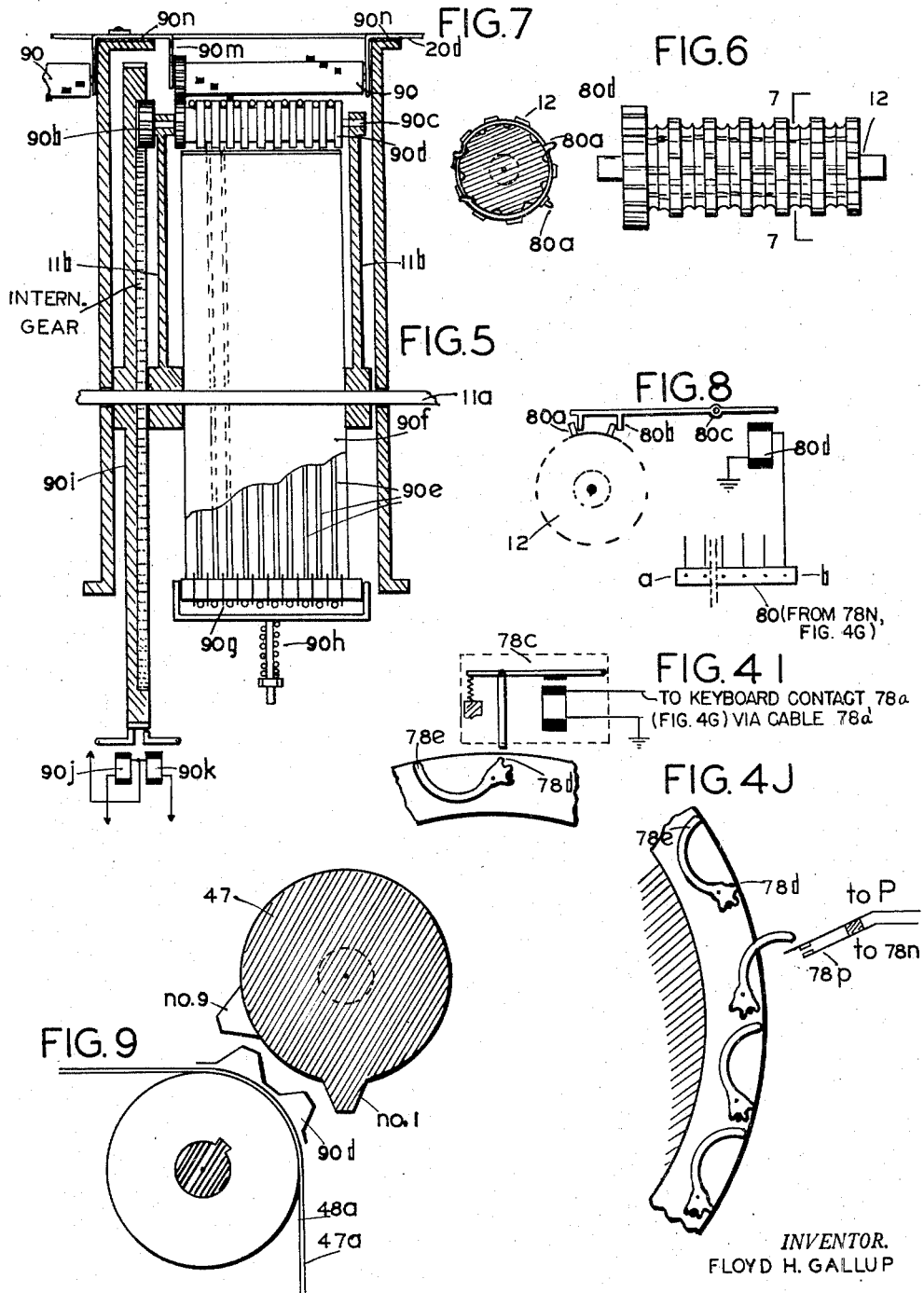

United States Patent Office 2,709,041
Patented May 24, 1955

2,709,041

CONTINUOUS RECORD BUSINESS MACHINES

Floyd H. Gallup, Washington, D. C., assignor of five and one-half per cent to Rudolph W. Dauber, Washington, D. C.

Application May 25, 1948, Serial No. 29,118

25 Claims. (Cl. 235—61)

This invention relates to business machines and aims generally to improve the same. In particular it aims to provide a business machine for continuously storing in the machine identifying and balance data, such as service or billing data of many accounts, and for making such data available at will, for example for the rendering of individual bills therefrom, for the rendering of combined daily balances and the like therefrom; and generally for performing combined functions heretofore requiring the use of uncoordinated records or machines and the intervention of mental and manual effort.

As the subject matter is somewhat involved, the description herein has been headnoted, and the headnotes are here gathered to constitute an index to facilitate cross reference between the several parts of this description:

1. Subject Matter in General
2. Drawings
3. Exemplary Embodiment
    A. Account selecting means
    B. Selecting operation
    C. Selector clearing and resetting
    D. Demand printing and scanning means
    E. Demand posting
    F. Demand limit sensing and recording means
    G. Demand controlled recording
    H. Delivery procedure
    I. Balance mensers
    J. Preposting carry and borrow sensing
    K. Posting mechanism
    L. Credit and debit limit indicator and posting control
    M. Posting operation
    N. Senser actuation of poster keyboard and account selector
    O. Deriving debit balances and true credit balances
    P. Converting "1 of 10" true outputs to pulsed outputs on "2 of 10" (prepulse plus 1 of 9) basis
    Q. Alternative converting means
    R. Exemplary recorders
    S. Recording operation
    T. Print-punch recording means
    U. Automatic recording of active account balances
    W. Flexible mensers
    X. Indicia mensers
    Y. Preferred cumulator mensers
    Z. Trolley bus connecting
4. Summary of operation Returning now to the invention herein disclosed:

1. SUBJECT MATTER IN GENERAL

The invention is herein exemplified by its application in a machine for monitoring the operations of a multi-customer oil business, and comprises the novel features and combinations hereinafter described and claimed. The term "registers" is sometimes used herein with respect to the elements retaining the individual accounting data, which elements constitute data-storing devices the position or condition of which controls the energizing of pilot or control circuits when the said elements of a particular account are connected to buses. As these elements are the "brain" or "memory" of the machine with respect to the data stored therein, for brevity and clarity they are generally termed "mensers," hereinafter.

2. DRAWINGS

In the accompanying drawings illustrating one mode of applying the invention to the oil delivery business by way of example:

Fig. 1 is a diagrammatic layout in plan view;

Fig. 2 is an exemplary embodiment of a delivery ticket;

Fig. 3 is a generalized diagram of the elements more fully set forth on Figs. 4A–4G, showing the general relations between them, and a key to Fig. 4, indicating the division of the exemplifying layout of Fig. 4 between Figs. 4A to 4G (Sheets 3 to 10), respectively of the drawings;

Figure 4A:
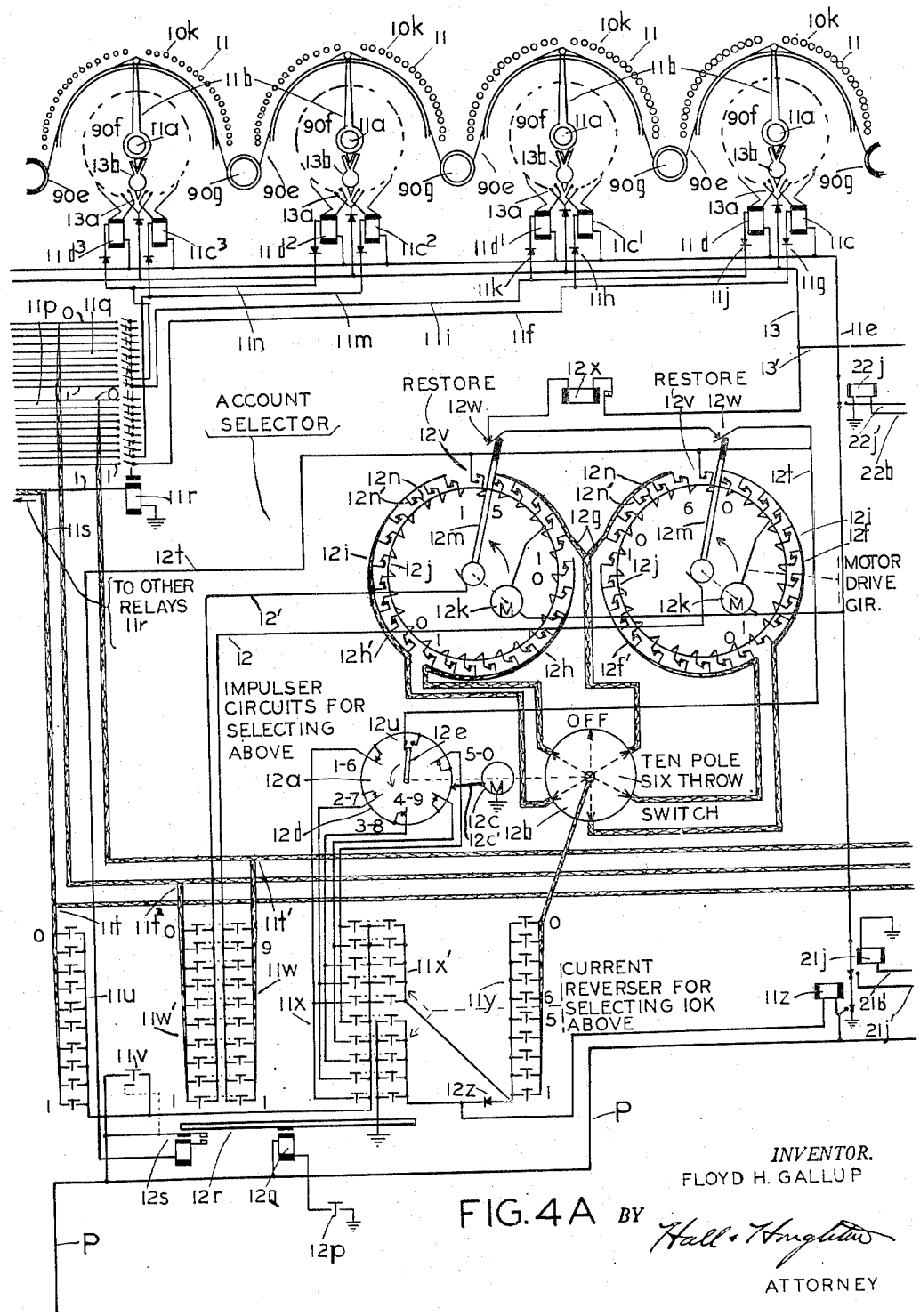
Figure 4B:
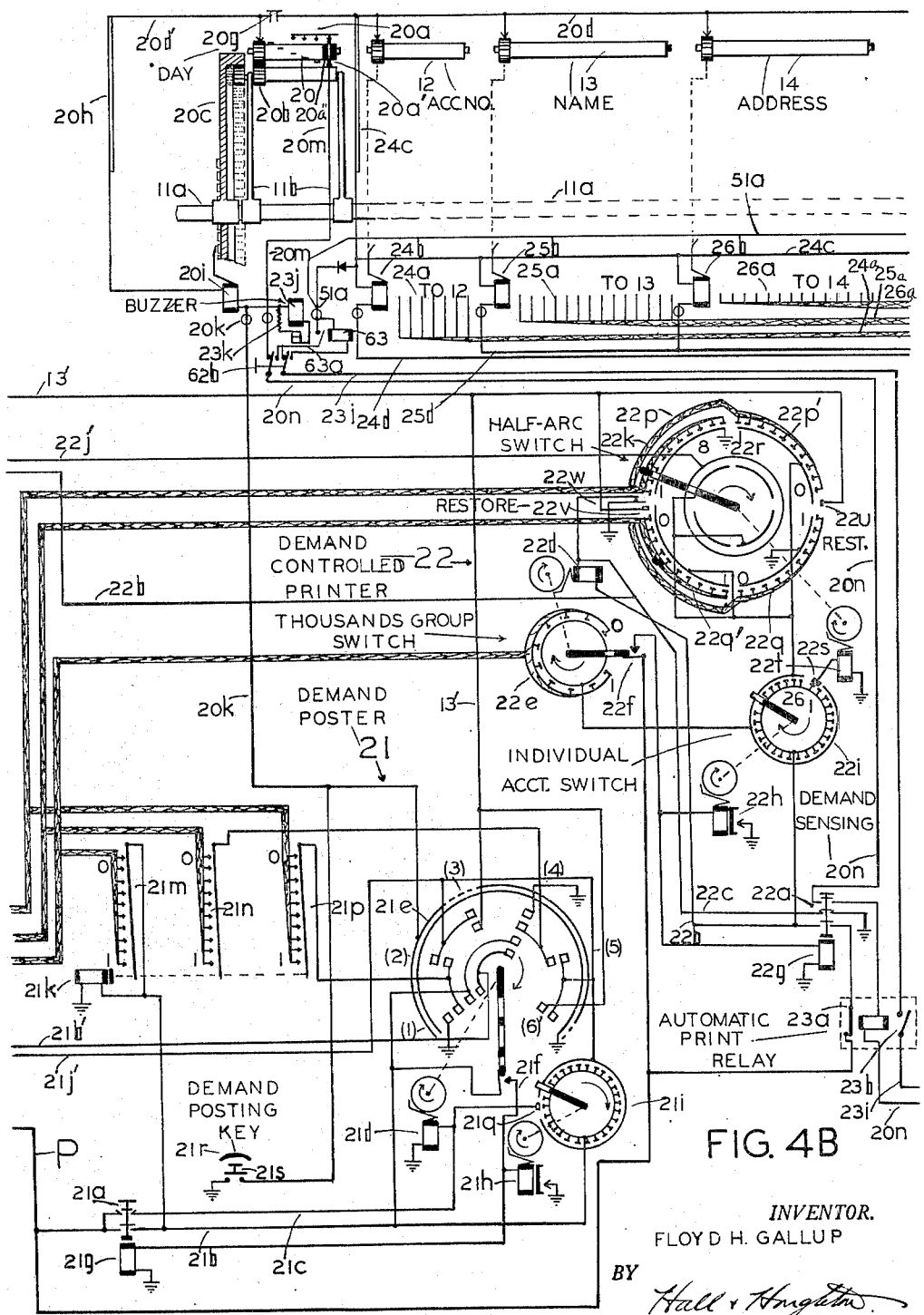
Figure 4C:
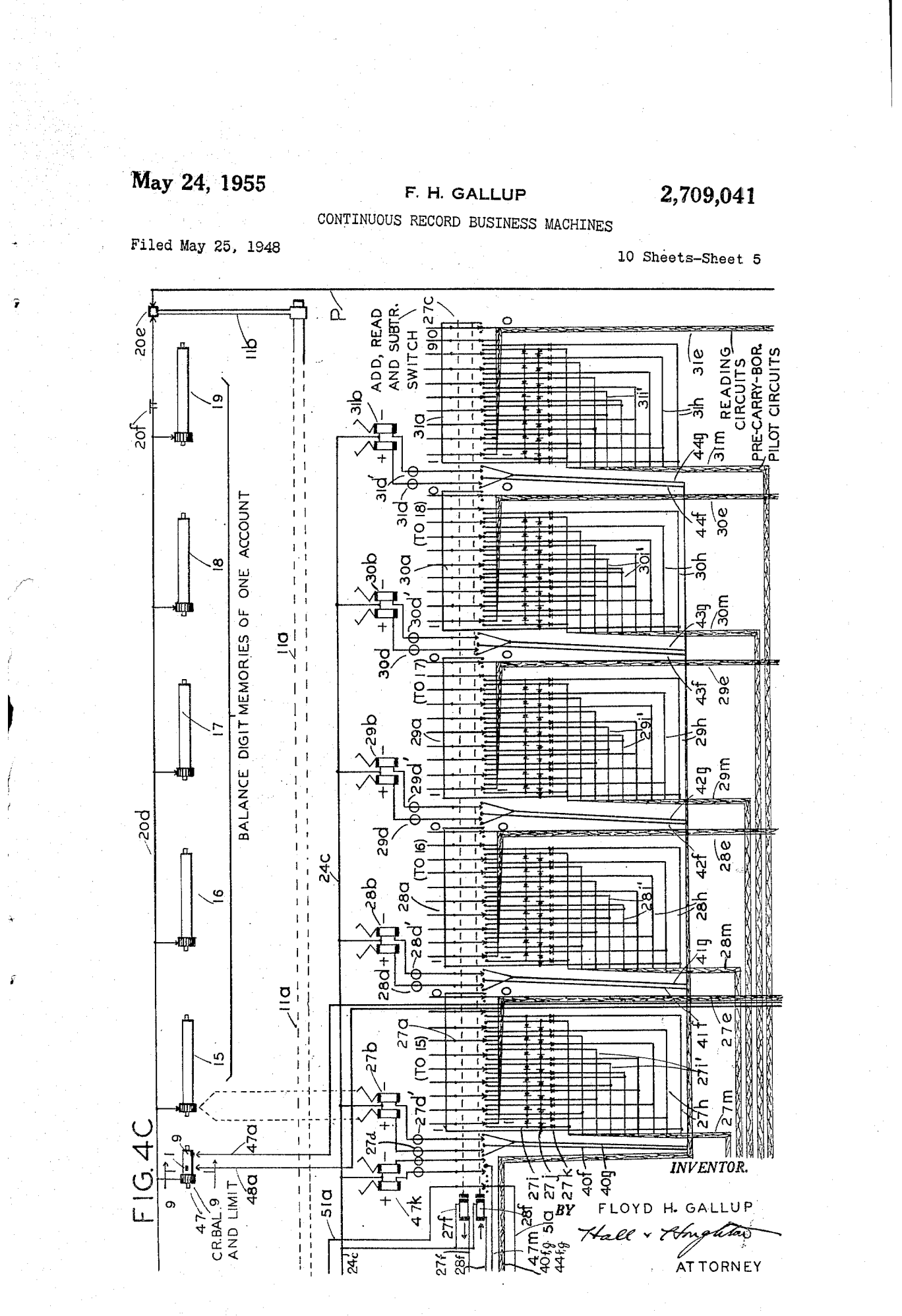
Figure 4F:
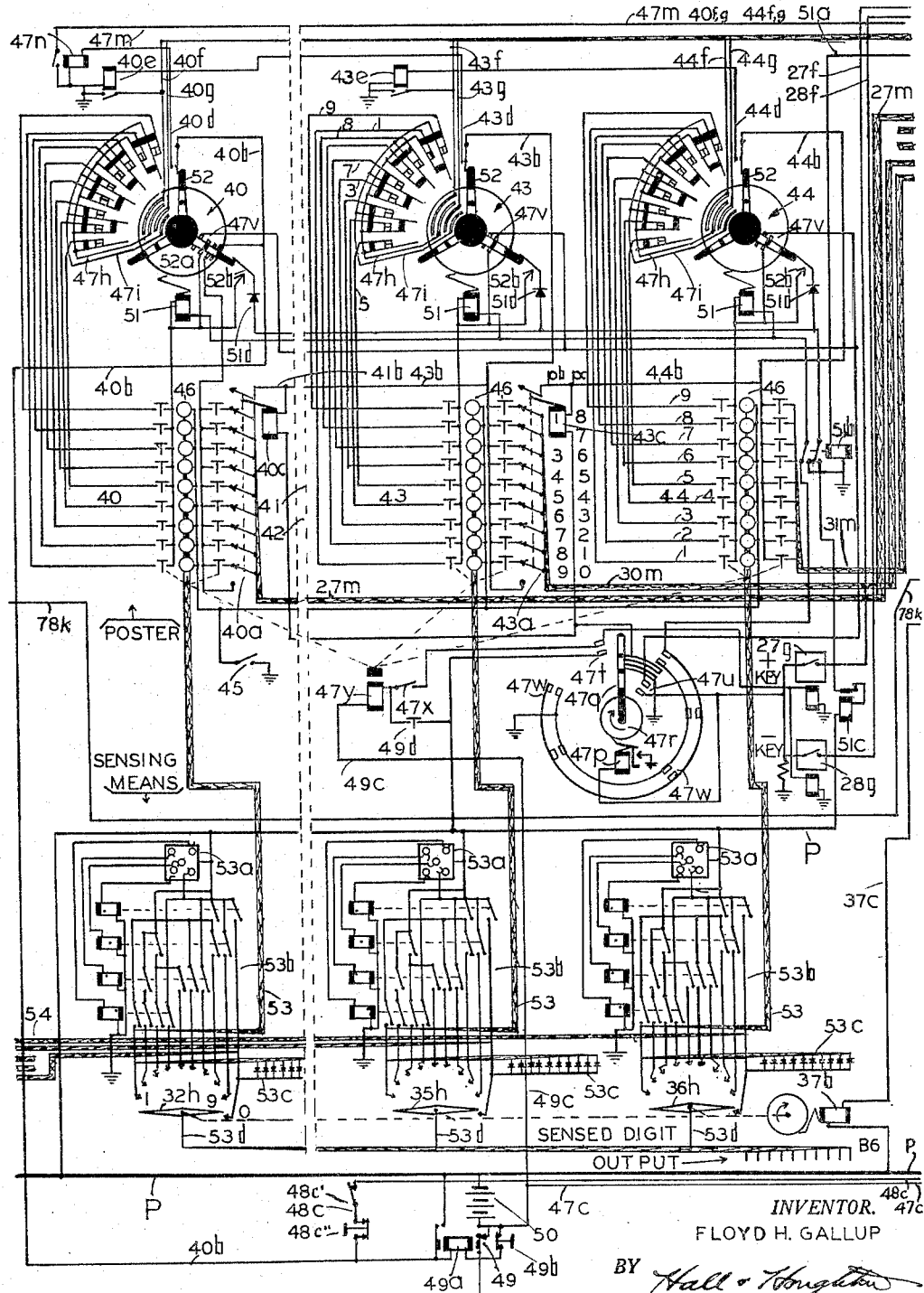

Fig. 4 which is divided into Figs. 4A through 4G, is a complete circuit layout of one form of the invention diagrammatically showing: in Fig. 4A the arrangement in arcuate bank form of the account mensers (viewed endwise) and a mode of selecting a particular account with relatively few relays and buses; Fig. 4B, the demand posting and sensing portions of the system together with the indicia mensers of a particular account (viewed sidewise); Fig. 4C, the account balance-retaining mensers of said account (viewed sidewise), the elements for connecting the busses thereof for algebraic addition of quantities thereto, and the arrangement for piloting the pre-carry and pre-borrow operations; Fig. 4D, the arrangement for deriving debit and credit balances from the balance mensers and for converting a "one-of-ten" indication into a "preliminary plus one of nine" output; Fig. 4E, a multi-column printer and a multi-column print-punch device capable of recording output from the indicia and balance mensers of selected accounts and of recording cooperating data from keyboard, computing, sensing, and flexible menser devices cooperable therewith; Fig. 4F, means for algebraically posting amounts in said balance mensers including pre-borrow and pre-carry mechanism and over-run lock-up means; Fig. 4G, a computer controllable by senser or menser outputs or manual keyboard, the products and quotients from which are connected for controlling entry thereof into the mensers of any selected account and/or for recording thereof by the recording elements of the system, as well as the keyboard-controlled flexible menser portion of the system;

Fig. 4H is a diagrammatic fragmentary section of a part of Fig. 4G;

Figs. 4I and 4J are more or less diagrammatic, fragmentary sections illustrating how the magnets 78c (Fig. 4G) set the toggles 78e, and how the so set toggles close the contacts 78p (Fig. 4G) respectively;

Fig. 5 is a more or less diagrammatic detail of an account selector drive and menser rotating drive, showing the preferred trolley bussing system;

Fig. 6 is a more or less diagrammatic detail of an adjustable indicia menser body;

Fig. 7 is a detail section of such body taken on the line 7—7 of Fig. 6;

Fig. 8 is a diagrammatic illustration of means for automatically adjusting the contact positions of the adjustable menser;

Fig. 9 is a diagrammatic sectional detail taken on the line 9—9 of Fig. 4C as indicated, showing one arrangement by which the credit balance bus and debit overrun bus may be energized selectively by the condition of the balance mensers of a particular account.

Fig. 10 is an enlarged detail of the side-contact lifter arrangement employed in switches 12, center of Fig. 4A.

Fig. 11 in an enlarged detail of the mutually insulated elements that electrically connect the leads 27a—31a, Fig. 4C, (90e, Fig. 5) selectively with the contacts of mensers 15—19, Fig. 4C, (90, Fig. 5).

3. EXEMPLARY EMBODIMENT

In its general comprehensive arrangement the machine or system exemplified in the drawings comprises a bank containing a multiplicity of mensers shown as electro-mechanical register elements adapted to retain pre-set and/or cumulated information, together with instrumentalities adapted to effect selection of the mensers of any particular account, to feed data thereto, to translate data stored therein, and to otherwise effect or use the contents thereof.

The menser bank preferably includes identifying mensers for each of the several accounts and/or statistical records with which the business to be monitored and registered or recorded by the machine is concerned. In accounting applications of the invention, the machine may include menser sections for each of the general ledger accounts, for each of the subsidiary ledger accounts, and for statistical data pertaining to such accounts, or to the business with which they are connected.

In the illustrative embodiment herein, as exemplifying the various accounts which may be controlled in the machine, reference is made to one of the general ledger account; e. g., accounts receivable, and to the subsidiary ledger accounts pertaining to individual customers or the like from which said accounts receivable are due, as well as inter-related scheduling and accounting instrumentalities pertaining thereto, and stock, zone, or like statistical accounts associated with said customers.

A general layout of such exemplary embodiment of the invention is shown in Fig. 1 in which there is illustrated in suitable relation to an operator's chair or station 10 the following illustrative elements; viz; the control keyboard or control desk which may comprise the account selector keyboard 10a, the function controlling keyboard 10b, the quantity posting keyboard 10c, and the flexible menser setting standard keyboard 10d, the computer keyboard 10e, sensing devices 10f and 10g, recording devices such as printers 10h and 10i, the flexible menser and menser setting devices 10j, and the menser live storage banks 10k. In the arrangement shown in Fig. 1, the several outlying elements are shown as connected to the prinicpal control desk by suitable cables 10m shown in dotted lines, through which the several controlling circuits and busses are carried. These outlying elements in general may be positioned wherever convenient, as on other floors of the building. In the illustrative arrangement herein, in which the system may take care of ten thousand accounts, the entire equipment may be housed in a single room of moderate size.

Exemplary forms of the several elements shown in the layout of Fig. 1 are exhibited in Fig. 4, the several parts of which are assemblable to provide a complete diagram in the manner indicated in Fig. 3.

GENERAL ARRANGEMENT

The general arrangement, disclosed more fully in Figs. 4A–4G, may be readily understood from a brief description of Fig. 3, in which block diagrams representing the several elements or subcombinations, are located in the key diagram in the same relative positions in which their details will be found in Figs. 4A–4G. Fig. 3 herein will therefore be referred to in sections lettered A, B, C, etc., to correspond to the sections of Figs. 4A–4G.

SECTION A, FIG. 3

An account selector keyboard 11u, etc., that controls an account selector pulsing switch generally designated 12. The selecting switches and keyboard, control selectors 11b, -c, -d, and 12a–b, that select a particular account out of a number of accounts (10,000 in the illustrative embodiment).

In the form shown, the memory units for each account (herein termed mensers for brevity) are in the form of rotatable rods having contacts spaced there along, in pairs an a 2-of-10 basis in the case of name and address mensers, and helically on a 1-of-10 basis in the case of Balance Digit mensers, the several mensers 12–20 and 47 for one account extending along the tops of Figs. 4B and 4C as indicated in Parts B and C of Fig. 3.

The 10,000 sets of memory units, one set for each account, are arranged herein in 200 arcs of 50 accounts each, as illustrated in end view in Fig. 4A, and indicated at the top of Part A of Fig. 3.

The account selecting pulsing switch 12 may be operated by the keyboard 11u, etc., manually, or the keyboard may be controlled automatically by a senser as described in Part N of this specification, for selecting an individual account. It may also be controlled by automatic means that will now be fully described, to post units of demand to all active accounts and to automatically print delivery tickets for all accounts needing oil delivery.

SECTION B, FIG. 3

The unit of demand to be posted to all active accounts is typified by the "degree day" accumulation in a fuel oil delivery embodiment. (The "degree-day" accumulation is a conventional procedure for determining from the severity of the weather how frequently a given customer's tank will need refilling.) This part of the system comprises means 21 for posting a unit of "degree-day" cumulation to all active accounts, taken in groups. The element 22 then scans all accounts one at a time, and initiates the printing of name and address and the printing and/or coding of the account number for each account needing delivery, this printing being effected by the alphabetical and numerical printer 60 (Part E) and the numeral coder 65 (Part E) under control of leads 23i and 20n leading from Part B to Part E.

The degree day accumulating menser 20, and the name and address (2-of-10 basis) mensers 12–14 are shown at the top of Fig. 4B, as indicated in Fig. 3, Part B, and the outputs 24a—26a from the name and address mensers lead from Part B (Fig. 4B) to the lower portion of Part D (Fig. 4D).

SECTION C, FIG. 3

This section comprises the numerical digit mensers 15–19 that show the balance of the accounts, the debit limit and credit balance menser 47; the elements for moving these elements of a selected account to post debits and credits thereto; and, circuit elements for putting to use the data stored therein. These elements comprise balance reading busses 27e—30e that lead through Part D (Fig. 4D) to Parts E and G (Figs. 4E and 4G); also comprising "precarry" and "preborrow" pilot circuits 27m to 31m that lead from Part C to Part E to inform the poster (Part F) of the balance already in the mensers of the selected account; and, also comprise multi-pole-double-throw switch means 27c (Fig. 4C) actuated by relays 27f, 28f, controlled by the "add" and "subtract" keys 27g, 28g (Part F), through leads extending from the upper right corner of Part F to the left center of Part C.

PART D, FIG. 3

This section comprises means controlled by the Debit Limit, Credit Balance menser 47 (Part C) for signalling the condition thereof; circuits supplied by leads 27e—31e from Part C for reflecting the balance digits in the balance mensers (Part C) and further instrumentalities. These further instrumentalities comprise a credit balance controlled switch 47e for deriving a true credit balance from a menser registered complement (i. e. the "10 complement" in the units column and the "9 complement" in the other columns). Also a means for eliminating the "figitive one" comprising switches controlled by the credit balance menser (47, Part C) through relays 35d, 34d, 33d, 32d, for shifting the reading circuits of the first significant figure column of a credit balance from a "9 complement" to a "10 complement" basis when the column to the right thereof shows zeros recorded in their associated mensers. Also a means (omission of zero leads to 32e, 33e, 34e in Fig. 4D) for eliminating the printing of left zeros. Further a means 35e (in 10's column Fig. 4D) for insuring the printing of two zeros and a zero balance. Finally, a means 32f—36f (Fig. 4D) for converting the 1-of-10 (or 1-of-9 with omitted zero) balance signals to prepulse plus 1-of-10 outputs for operating the printers (Fig. 4E) through output terminals B4, B5, etc. (bottom of Part D) that plug into printer inputs (top of Part E).

PART E, FIG. 3

Comprised here are the alphabetical and numerical printer 60 and the numerical printer and coder 65, for printing and coding delivery tickets, printing and coding invoices, and printing trial balances, etc. These printers are supplied with numerical data from the balance mensers 15—19 of any selected account (top of Part C). The alphabet printer is also supplied with data from the alphabet mensers 12–14 (top of Part 4B) via leads 24a—26a that extend from Part G to Part B and there terminate in connectors B1—B3 that plug into printer input C (Part E). The printer actuating means is also comprised in this section of the system.

PART F, FIG. 3

The upper half of this part comprises a "short-cut" poster, with a poster keyboard 40—44 therebelow. The keyboard may be manually controlled, or may be operated by magnets 46, energized (1-of-10 basis) by the output of the senser 53a (2-of-5 basis) corrected to a 1-of-10 basis by permutation switch means 53b and then supplied to magnets 46 through leads 53; or by the output of a computer (1-of-10 basis) supplied by leads 53 through leads 54.

The keyboard 40—44 receives not only the digits to be posted, but also the existing balance in the account (via precarry and preborrow leads 27m—31m that extend from Part C to Part F), and the arrangement predetermines whether the necessary "carries" or "borrows" will convert the balance from debit to credit, or exceed the capacity of the machine. In the latter case, the arrangement signals the operator. Otherwise, it enters in a "short-cut" fashion (e. g., if 6 is to be added to a menser containing 8, it subtracts 4 from the menser and carries 1 to the next, instead of stepping the menser 6 times).

This part of the machine also includes (bottom of Part F) means for actuating the printer (Part E) to print a journal or the like as the sensed quantity is posted to the account mensers, comprising means 32h—36h (Fig. 4F) for converting the sensed and converted, or computed, 1-of-10 input to leads 53 to a 2-of-10 input of connector B6 (Fig. 4F), that is also supplied with the name and address and account number from the mensers of the selected account.

PART G, FIG. 3

This part shows two portions of the system that are optionally used. The first is a computer 70 that may be used to derive extensions from quantities and unit prices, and to supply such extensions to the poster. Obviously such extensions may be derived manually or in any other way, so that the use of the associated computer 70, while convenient, and therefore desired, is not essential to the system as a whole. The second is a typewriter keyboard controlled means 78 for setting the movable elements of the 2-of-10 name and address and other fixed data mensers used at 12—14 (Part B) to correspond to the letters and numerals of the name, address, etc., of the account to be registered therein. With this variable menser "setter-upper" is associated a set of reading leads 78n, Fig. 4G (2-of-10 basis) that are connected to the input to printer 60, Part E, to verify the entered name and address before the variable menser is inserted in its intended position in the arcs of mensers.

With the above general description in mind, the individual parts (Figs. 4A–4G) will now be described in detail, the operation of each unit being set forth appropriately as the description proceeds.

(A) *Account selecting means*

As shown in Fig. 4A the menser live storage banks 10k preferably comprise mensers for individual accounts arranged arcuately in banks of say fifty accounts. In Fig. 4A each of the small circles 11 in each of the arcuate banks 10k represents the menser group for a particular account (viewed end-on). Each of these menser groups 11, one of which is shown in side elevation in Figs. 4B and 4C, comprises indicia mensers 12, 13 and 14, balance retaining mensers 15, 16, 17, 18, and 19 and demand and control mensers 20 and 47 in the exemplary form, the respective functions of which will be hereinafter described. Referring again to Fig. 4A each arcuate bank of menser groups 11 is provided with a selector means comprising the shaft 11a and arms 11b (see also Figs. 4B and 4C) for connecting electrically and mechanically to any account menser group 11 of any arc.

In the form of Fig. 4A fifty account menser groups 11 are included in each arc and these are divided into two groups of twenty-five, and the arms 11b initially rest in a central neutral position between the two groups as shown, and may move across either group to a further neutral position therebeyond. The movement of the respective shafts 11a and arms 11b is effected by stepper elements which comprise pawls driven by solenoids or magnets 11c, 11d, 11c', 11d', etc. Any of the many known forms of pawl and ratchet elements may be employed. As exemplified in the upper right-hand corner of Fig. 4A, each shaft 11a carries two-way actuable ratchet wheel means shown in dotted outline, and the pushing-pawls carried by the movable armatures of the solenoids or magnets 11c, 11d, etc., act on the associated ratchet wheel means, respectively, to step it and the shaft 11a in the indicated direction.

In the form shown all of the magnets 11c and 11c', etc., are connected at one end to a common bus 11e. The opposite ends of the two elements 11c, 11c' are connected to a common lead 11f by connections including rectifiers or like one-way current devices 11g, 11h directed in opposite directions. The two elements 11d, 11d' are similarly connected to a common lead 11i with the connections including similar one-way current devices 11j and 11k. The two elements $11c^2$, $11c^3$ are similarly connected to common leads 11m, 11n, and like connections are effected with respect to the corresponding elements in all other arcs in the machine. The leads 11f, 11m, etc., are connected to busses of the account selector bus bank 11p and the companion leads 11i, 11n, etc., are connected to the busses of selector bus bank 11q through multiple contact single-throw solenoid operated switch means 11r which will now be described.

In an accounting system comprising ten thousand accounts arranged in two hundred arcs of fifty accounts each, ten of the switches 11r are provided each of which closes twenty pairs of actuator leads 11f, 11m, 11i, 11n, etc., to the twenty selector busses 11p, 11q. Each of the ten switch elements 11r is connected by a lead passing through the cable 11s to the division point 11t (the purpose of which is hereinafter described) and thence to its appropriate keyboard contact in the "Thousands" key bank 11u. Closing of one of the keys in the bank 11u, as is apparent from Fig. 4A, connects the selector switch 11r to the power switch 11v in the control keyboard, and if this switch is closed to the power source P the selector switch 11r is energized to connect the associated selector actuators to the bus banks 11p, 11q.

Still referring to Fig. 4A, the switch 11r there shown (one of ten such switches individually connected to the contacts of key bank 11u) connects to the busses 11p, 11q twenty (20) pairs of actuator leads (11f, 11m; 11i, 11n, etc.) for twenty arcs 10k (four of which are shown in Fig. 4A). Thus the switch 11r, Fig. 4A (and each of the other nine similar switches, not shown) selects for actuation twenty menser arcs containing a total of one thousand accounts. Thus the ten keys of the bank 11u, and their associated switches 11r constitute means for selecting each a sub-group of one thousand accounts out of the ten thousand referred to in the present exemplary embodiment.

The individual busses of the bus banks 11p, 11q are carried through cables past division points 11t', 11t'² to the individual contacts of a double-pole single-throw keybank 11w, 11w' where they are selectively connected in pairs to pulsing leads 12, 12' hereinafter described.

The system shown in Fig. 4A identifies each account by a four-digit account number. The first or thousands digit is entered in the single-pole single-throw key bank column 11u; the second digit in the ganged or double-pole single-throw key bank column 11w, 11w'; the third digit in the ganged or double-pole single-throw key bank column 11x, 11x'; and the fourth or last digit in the single-pole single-throw key bank column 11y, the keys of these columns being arranged in banks of the releasable lockdown type much like those of an ordinary multibank adding machine keyboard.

The connections of the "Thousands" and "Hundreds" key banks 11u and 11w–w' have already been mentioned. Those of the "Tens" column will now be set forth. The contacts 11x in the third column are energized from the power switch 11v and selectively energize side contacts of a six-point selector 12a which controls the position of a ten-pole six-position switch 12b under control of a motor 12c.

Each of the side contacts of the switch 12a makes contact with a common ring 12d which supplies power to motor 12c through lead 12c', or alternately controls supply of power thereto through a relay or the like. As the motor drives the arm 12e from its initial neutral position shown, this arm lifts each of the side contacts off the ring 12d. Thus when the side contact energized from key bank 11x is raised, the motor 12c is stopped and the ten-pole six-throw switch 12b is left in the corresponding position. The motor 12c may be of any suitable form; for example a stepper motor may be used or a quick-stopping continuous-run motor such as one provided with a magnetically released brake.

The switch 12b, Fig. 4A, transfers the ten leads from the units key bank 11y from neutral or "off" position to the selected group of ten side contacts 12f, 12f', 12g, 12h, 12h'. As only one of the ten leads so transferred is energized from units key bank 11y, that particular side contact establishes a circuit from the common bus of the "units" key bank 11y to the ring 12j of the associated switch section 12i and the circuit through one of the rings 12j being completed, the motor 12k which is connected thereto and to the return 11e is energized. The arm 12m of the half stepper 12i is therefore moved from its neutral position shown and as it travels along this arm sequentially engages the contact elements 12n which extend from the ring 12j, and on each such contact complete the circuit from the ring 12j to the pulsing lead 12 or 12' and thence through the key bank 11w or 11w' to the selected bus of the bus bank 11p, 11q. As each contact element 12n is engaged by the arm 12m (see Fig. 10) its engagement with the side contacts 12n' of the sections 12f through 12g, or 12g through 12h', is broken. Thus when the arm 12m has moved from its neutral position to the side contact which energizes the ring 12j, it breaks the connection from that side contact to the ring, causing associated motor 12k to stop. The motor 12k may be of any suitable positive-stopping type as a continuous-drive motor with automatic brake, or a stepper motor.

It will be noted that each of the leads 12 and 12' by way of contacts 11w—11w' is connected to one of the leads associated with the busses 11p, 11q. Considering lead 11f for example, pulses of current therein coming from the lead 12 will energize the actuator 11c', while pulses of current therein going toward the lead 12 will energize the actuator 11c. The direction of current flow in the lead 12 (and in the lead 12', which is similarly associated with leads 11i, etc., through key bank 11w') is controlled by the right-hand contacts 11x' of the Tens key bank 11x—11x'. When one of the keys numbered six to zero in this bank is closed, the current from the power source 11v is fed to the common lead of the key bank 11y and thence to the ring 12j and pulsations thereof are fed through the lead 12 to the stepper 11c' etc. When one of the keys numbered one to five in the key bank 11x' is closed, the common lead of the key bank 11y is grounded and at the same time a relay 11z is energized for transferring the return 11e from ground to the power line P. Thus in this instance power is supplied through the lead 11e and the actuator 11d, etc., and thence through lead 11i, etc., the associated bus of bank 11q, the key bank 11w, 11w', the arm 12m, to ring 12j and returned to earth via key bank 11y. Accordingly the direction of the current in the circuit, which is determined by key bank 11x', determines which of the paired actuators 11c, 11c', etc., is put into operation.

(B) *Selecting operation*

From Fig. 4A it will thus be apparent that when it is desired to select any given account, say account No. 1247, it is merely necessary for the operator to depress the corresponding keys in the key bank 11u, 11w—11w' 11x—11x' and 11y. Closing of the motor bar or power switch 11v then automatically initiates selection of the proper group of arc actuators 11c, 11d, etc., and automatically selects the direction of current flow and the position to which one of arms 12m must move before breaking the circuit, and the ensuing pulses from the arm 12m are conveyed over the appropriate bus of the groups 11p, 11q to move a single one of the shafts 11a and stop it with the arms 11b in engaging relation with the particular account menser group 11 desired. The entire selecting arrangement then comes to rest until such time as the operator sees fit to actuate the clearing key 12p, Fig. 4A. During this interval of rest any desired funtcion may be performed by common elements shown in Figs. 4B through 4H, in association with the menser registered data of the particular account selected by the elements of Fig. 4A.

(C) *Selector clearing and restoring*

After an account has been manually selected in the above fashion and the desired function has been performed therewith, the operator need close only the clearing and restoring contact 12p to restore the entire selector mechanism to its initial condition. In the form shown the closing of the contact 12p energizes the solenoid 12q which pulls down the clearing bar 12r and clears the key banks 11u, 11v, 11w—11w', 11x—11x', 11y in a conventional manner. At the same time bar 12r closes the contacts of a slow-releasing stick switch 12s through which power is supplied to the restore lead 12t. This lead, through the side contact 12u in the neutral position of the six-position switch 12a, energizes the ring 12d whereupon the motor 12c drives arm 12e around until it reaches the neutral position shown and lifts the contact 12u from the ring 12d. At the same time the lead 12t, by way of the closed side contact 12v of the operating switch 12i, energizes the ring 12j thereof. The key banks 11x, 11x' having been cleared, the return 11e from the motors 12k is grounded. Hence the motor 12k of the operating switch 12i is energized and rotates the associated arm 12m to its neutral position where it opens the contact 12v.

As, or just before, the arm 12m reaches its neutral position it closes the associated contact 12w. The other contact 12w being closed since the other switch arm 12m is in neutral position, a restoring circuit is thus established from the lead 12t through the relatively rapid buzzer type pulser 12x to the selector-restoring bus 13. This bus 13 is connected to side contacts 13a which are closed by toggles 13b when the arms 11b are stepped away from their neutral positions shown (Fig. 4A). It will be seen that when one of the arms 11b is stepped counterclockwise by the actuator 11c, for example, the side contact 13a of the reverse-direction actuator 11d is closed. Hence when current is supplied through line 13, the actuator 11d is energized in a pulsating manner by the pulsator 12x and steps the arm 11b backwards to its initial neutral position. The stick switch 12s as above mentioned is of a dashpot or other slow releasing type and does not break contact during the short periods of interruption of current by the pulsing buzzer 12x. When the neutral position of the arm 11b is reached, the toggle 13b is moved to break the connection from side contact 13a to actuator 11d and the restoring operation is thus terminated at the central neutral position of the arm 11b.

When the circuits from line 12t through side contacts 12u, 12v and 13a have been interrupted, current flow in circuits 12t ceases and stick switch 12s releases leaving the selector in condition for selecting another account. The bar 12r clears not only the helddown keys in the key bank 11u, 11w—11w', 11x—11x', 11y but also the helddown power supply key 11v.

The restorer stick switch 12s may be interlocked with the power key 11v as indicated by dotted lines so that the power key cannot be closed during the restoring operation as indicated, for this purpose, the relay 12S, when energized, may move a stop member into a position to prevent manual operation of key 11v. As the keyboard 11u, 11w—11w', 11x—11x', 11y is thus not energized, the number of the next account to be selected can be entered thereon during the restoring operation if desired.

The rectifier 12z adjacent key bank 11y provides for return flow of current from the common lead of the key bank 11y to earth when one of the keys numbered one to five in the bank 11x—11x' is closed, and prevents flow of current from the relay 11z to earth via the key bank 11y when one of the keys numbered six to zero in bank 11x' is closed.

(D) Demand posting and sensing means

In many businesses, as exemplified in the oil business, some factor of customer demand must be kept track of. In some instances such factor may be excessive credit extension, or arrearage in payment or the like; in the oil business such factor may be the expected oil consumption. Such expected oil consumption is generally calculated on a "degree-day" basis determined by formula from the weather cycle of the local community. A certain customer may have a certain size installation from which it is estimated that his tank will require filling after the accumulation of four hundred "degree-days." Another customer's tank and installation may be such that it requires filling after, say, five hundred "degree-days." Heretofore it has required much labor on the part of clerical force to post increments of "degree-days," as they accumulate, to the "degree-day" records of all customers and determine when "automatic delivery" should be made.

In the present system one menser of the account groups 11, as the menser 20, Fig. 4B, is a "degree-day" cumulating menser. This menser may be generally constructed in the same form as that shown in Fig. 5 hereinafter described, and is preferably provided with a fan contact 20a engaged with a ring contact 20a' on, but insulated at 20a from, the menser, the fan switch being movable to a position to be engaged by, and connected to the ring contact, the "degree-day limit" contact of the particular account menser 20, and all contacts of the said menser of higher value. As shown in Fig. 4B when the arms 11b are moved to select a particular account, an idler 20b is moved by the arm 11b into an interengaging position between the menser 20 and the "degree-day" drive gear 20c. At the same time the power lead P, Fig. 4C, is connected to the account bus 20d by the contact closer 20e carried on one of the arms 11b. If the account is active, an active link 20f, Fig. 4C, is closed across the major portion of the account bus 20d and that bus becomes energized throughout Fig. 4C and the adjacent portion of Fig. 4B up to the "suspend service" link 20g. If this link 20g is closed the account bus 20d is connected to the line 20d' which connects to the menser 20 and to the "degree-day" arc bus 20h. The "degree-day" arc bus 20h connects to the leads 20d' of the account groups 11 in a particular arc 10k and feeds power from whatever active account is engaged by arms 11b to the "degree-day" drive gear actuator 20i for that arc of accounts. This actuator 20i preferably comprises a cocking relay which is cocked when energized and operates when de-energized, and on uncocking the actuator 20i moves the "degree-day" drive gear 20c one step. This motion drives the idler 20b one step and rotates the menser 20 one step, thus entering therein one unit of demand, corresponding, say, to the accumulation of one hundred "degree-days." (This accumulation, of course, may be kept by memorandum or on a special menser account within the machine if desired.) It will be appreciated that an actuator 20i is provided for each arc 10k (Fig. 4A) and that the return leads from these actuators are connected to a common bus 20k, Fig. 4B.

The idler 20b may carry a demand sensing bus 20m in any suitable way, for example trolleywise in the fashion shown hereinafter in Fig. 5, so that the latter makes contact with the ring contact of the menser 20 of the particular account selected by the arms 11b.

(E) Demand posting

Means 21 is provided associated with the bus 20k for automatically entering a unit of "degree-day" cumulation in the mensers 20 of all active accounts. In the form shown (Fig. 4B) this means 21 is arranged as follows:

A "degree-day" key 21a is provided on the control board which has two functions (1st) it closes the power lead 21b from the power source P, and (2nd) it makes transitory contact to the pilot lead 21c from the same power lead. This transitory contact supplies an initiating pulse to the cocking actuator 21d which on de-energization moves the arm of the group selector switch 21e sufficiently to release the circuit breaker 21f. When the transitory contact is broken the actuator 21d moves the group selector switch 21e from its neutral position shown to its first clockwise position, at the same time releasing the circuit breaker 21f and supplying current to the holding coil 21g to hold closed the key 21a.

The closing of the switch 21f also supplies current to the slow acting stepping actuator 21h which drives the pulser 21i.

In the first clockwise position of the group selector switch 21e, the power source 21b is connected through lead 21b' to relay 21j (Fig. 4A) which transfers return 11e from its ground connection, Fig. 4A, to the lead 21j' connecting to the outer ring of the pulser 21i. The energizing of lead 21b also excites a solenoid 21k (Fig. 4B) which closes gang switches 21m, 21n, and 21p. The switch 21m closes simultaneously all of the leads from the circuit closers 11r (Fig. 4A) and thus connects all selector actuators 11c, 11d, etc., to the busses 11p, 11q (as though all the "Thousands" keys of the key bank 11u of Fig. 4A were closed simultaneously). The switch 21n closes together all of the leads from the busses of bus group 11p, the switch 21p closes together all of the leads from the busses of bus group 11q (as though all the "Hundreds" keys of one side of the key bank 11w or 11w' of Fig. 4A were closed simultaneously). In the first position of the switch 21e the common lead from switch 21p is connected to ground. The actuator return bus 20k in all except the neutral positions of the switch 21e is connected to ground as shown. As a result of these connections, the operation of the pulser 21i supplies current from lead 21b through the lead 21j' to lead 11e and alternate selector actuators 11c, 11c², etc., for twenty-six pulses. In this way the arms 11b of alternate arcs are stepped from the neutral positions shown (Fig. 4A) sequentially throughout half arcs of the arc 10k and into the twenty-sixth or end neutral position. As each arm 11b closes and opens the contact closers 20e (Fig. 4C) associated with the respective account busses 20d, the stepper actuators 20i (Fig. 4B) are operated to rotate the "degree-day" drive gears 20c. This produces rotation of the idlers 20b and enters one unit of "degree-day" cumulation on the mensers 20 of each of the active account registers 11 contacted by the operating arms 11b.

When the pulser 21i reaches its 27th position it closes and opens the independent contact 21q which again actuates the stepper actuator 21d and moves the group selector switch 21e to its second position. In this position the relay 21j (Fig. 4A) is de-energized so that lead 11e returns to ground. The common lead from switch 21p is connected to the outer ring of the pulser 21i. Current in a reversed direction is therefore supplied through the leads 11f, 11m, etc. (Fig. 4A), and the alternate actuators 11c', 11c³, etc., not previously operated are energized by the pulser 21i (Fig. 4B). Thus the remainder of the arms 11b are moved in the same direction as those previously moved, effecting entry of "degree-days" in the respective halves of the arcs 10k and coming to rest in the twenty-sixth or neutral position at the end thereof.

Following these twenty-six pulses the independent contact 21q (Fig. 4B) is again energized by switch 21i moving the group selector switch 21e to its third position. In this third position the lead from the switch 21p is disconnected and the power output from the pulser 21i is connected through lead 13' to the restore lead 13, Figs. 4B and 4A, and through the side contacts 13a (Fig. 4A) to the companion actuators 11d, 11d', 11d², etc. The twenty-six pulses from the switch 21i thus operate to restore all of the arms 11b to the central neutral positions shown in Fig. 4A. If the grounding of lead 20K is maintained during this restoration, one more unit of degree accumulation will be entered in each active account as the selector arms and shafts are restored to mid-position, due to closing of the contacts 20e (Fig. 4C, upper right) for each account as arm 11b passes the same. This action is not objectionable if two posted units equal one unit of degree day accumulation, or if two units are accumulated before posting, but posting during the restoring operation is readily avoided, if desired, by considering the restoring positions as neutral positions for posting of degree days and suspending the grounding of lead 20k during the restoring operations (positions 3 and 6 of switch 21e neutral for posting) as shown.

The ensuing closing of the contact 21q on switch 21i steps the switch 21e to its fourth position. This connects the leads from the switch 21n to ground and otherwise performs the same functions that it does in its first position. The twenty-six pulses of switch 21i thus operate the actuators 11d, 11d², etc., to move half of the arms 11b to their opposite extreme positions, entering "degree-days" in each active account passed thereby. The fourth closing of the side contact 21q steps the switch 21e to its fifth position which actuates the alternate arms 11b to bring all of said arms to their opposite extreme neutral positions. The fifth closing of the side contact 21q of switch 21i then effects restoration of all the arms 11b to their central neutral positions. The sixth closing of the side contact 21q steps the switch 21e from its second restore position back to neutral and opens the circuit breaker 21f which de-energizes the holding coil 21g and terminates the "degree-day" entering cycle.

A manual "degree-day" entering key 21s protected by a cover 21r (Fig. 4B) is also provided for the entry of corrections in the "degree-day" cumulator of any account selected by the account selector (Fig. 4A).

From the foregoing it will be appreciated that by this arrangement a unit of demand cumulation may be entered in all active ones of the ten thousand accounts in the extremely short period of time required for one hundred sixty-two pulses of the switch 21i. With less than three pulses per second, this complete operation requires only about two minutes, and it is effected in its entirety by a single depression of the "enter degree-day" key 21a.

(F) *Demand limit sensing and recording means*

Following the posting of units of demand to the several accounts it is necessary to determine which accounts, as the result of such posting, have cumulated enough units of demand to require servicing, as delivery of oil in the case of "degree-day" cumulations.

In the form shown in Fig. 4B, the determination of accounts requiring servicing and the recording of the identifying data of such accounts on delivery tickets and the like (such as that shown in Fig. 2) is effected by demand sensing and recording means 22. For demand recording, the demand-print and the billing print switch 62b (at the upper left of Fig. 4B, and hereinafter described) is closed to the elements 20m and 23k. Operation of the demand sensing and recording means is then initiated by depressing the demand sensing key 22a. This connects the power lead 22b, to the power bus P, connects the demand sensing bus 20m, through closing of the demand pilot lead 20n, and effects a transitory grounding contact of the starter pilot lead 22c.

The transitory closing of the lead 22c completes the circuit from power lead 22b through the cocking relay 22d and back to earth, and breaking of the transitory contact in switch 22a allows the cocking relay 22d to move the arm of sub-group selector switch 22e from its initial position to the first position shown. This movement releases the circuit breaker 22f and completes the circuit from the power lead P through the holding coil 22g to retain key 22a in operating position, and also energizes the slow acting stepper actuator 22h which drives the twenty-seven point pulser 22i.

The supply of power to the power lead 22b also energizes the transfer relay 22j (Fig. 4A) which transfers the common return 11e of the selector actuators 11c, 11d, etc., to the return lead 22j'.

The actuator selecting switch 22k is a forty-two position switch also provided with a side contact 22w (hereinafter described), and the individual bus leads from the busses 11p, 11q, Fig. 4A, via division points 11t', 11t², are distributed respectively in ten-point sectors 22p, 22p', and 22q, 22q' of the switch 22k. In its initial position the arm 22r of switch 22k coincides with the first position of the sector 22p. Thus in this position and in the subsequent nine positions of this first sector the respective ones of the busses 11p are sequentially connected to ground, while the return 11e from the actuators 11c, 11d is connected through lead 22j' and associated contact of arm 22r to the outer ring of the twenty-seven point pulser 22i.

In the initial position of the arm 22r the pulser 22i applies twenty-six pulses of current via line 22j' (Fig. 4B) through the circuit 11e, 11c, 11f (Fig. 4A). The actuator 11c thus steps the associated arm 11b counterclockwise across the twenty-five account groups near the righthand end of Fig. 4A and into its left-hand end neutral position, assuming that none of these accounts has reached its demand limit so as to energize the lead 20*m* (Fig. 4B).

In its twenty-seventh position the switch 22*i* closes the side contact 22*s* which energizes and then de-energizes the cocking stepper 22*t*. This moves the arm 22*r* of switch 22*k* to its second position in the sector 22*p*. The same operation as before is then repeated for actuator 11*c*², Fig. 4A.

In the remainder of the positions of the actuator in segment 22*p* of switch 22*k*, the same operations are again effected for alternate ones of the twenty actuators connected to busses 11*p* by the first position of the sub-group selector switch 22*e*, so that on completion of the scanning of the sector 22*p*, Fig. 4B, the alternate arms 11*b* of this group of arcs have been moved to the appropriate end neutral positions.

The next energization of the side contact 22*s* of pulser 22*i* moves the arm 22*r* of switch 22*k* to the first position in the second sector 22*p'*. In this sector the leads from the division point 11*t'* are connected to the pulsing power and the return 11*e* is connected to ground. Thus the operations performed in the first sector are now repeated with the current flow in reversed direction. This energizes the actuators 11*c'*, 11*c*³, etc. (Fig. 4A), and thus moves the associated arms of these actuators sequentially across their half arcs into their end neutral positions. Thus on completion of the pulsing in the last position of sector 22*p'* all of the arms 11*b*, Fig. 4A, of the ten arcs selected by the first position of sub-group selector switch 22*e* lie in their left-hand neutral positions.

The side contact 22*s*, by stepper 22*t*, then steps the arm 22*r* to a restore contact 22*u*. In this position the common return bus 11*e* is grounded and current is supplied through the restorer bus 13 to the side contacts 13*a* for all the arcs 10*k*. The ensuing twenty-six pulses of the switch 22*i* therefore operate the actuators 11*d'*, 11*d*², etc., to step all of the previously moved arms 11*b* back to their central neutral positions. The arm 22*r* is then stepped to the first contact of the sector 22*q*.

In sector 22*q* the operations performed in sector 22*p* are repeated so as to operate alternate actuators 11*d*, 11*d*², etc., to move their associated selector arms 11*b* through the opposite halves of the arcs 10*k*. In sector 22*q'* the intervening actuators 11*d'*, 11*d*³, etc., of the group connected by the first position of sub-group selector switch 22*e* are similarly actuated.

When all of the arms 11*b* of this group have thus been moved to their extreme right-hand positions (Fig. 4A), the arm 22*r* steps to restore contact 22*v* (Fig. 4B) and all the arms are restored to central neutral position as before. Following this operation, the side contact 22*s* of switch 22*i* steps arm 22*r* to its initial position but during this stepping operation the arm 22*r* transitorily closes side contacts 22*w*, which energizes and de-energizes the cocking actuator 22*d* of sub-group selector switch 22*e* and thus moves its arm on to its second position. The operations which were performed in the first position of the switch 22*e* are now repeated for a different group of twenty arc actuators.

In effect the first position of the switch 22*e* corresponds to the closing of the first key in the key bank 11*u* (Fig. 4A), the second position to the closing of the second key therein, etc. The first position of the sector 22*p* corresponds to closing of the first key in the key bank 11*w*, as does the first position in the sector 22*p'*, and the operations of the pulser 22*i* correspond in these two sectors to the operations of the switch 12*i* in Fig. 4A. The restorer contacts 22*u* and 22*v* correspond to the restorer contacts 12*w* in Fig. 4A. Similarly the initial contact in sector 22*q* corresponds to closing of one of the contacts in the half key bank 11*w'*, Fig. 4A, as does the first contact in the sector 22*q'*.

Thus in effect the operation of the demand sensing and recording means 22 corresponds to entry of each and every one of the ten thousand accounts numbered from 0000 to 9999 in the keyboard banks 11*u* to 11*y* (Fig. 4A).

As the final closing of the side contacts 22*w* (Fig. 4B) moves the arm of switch 22*e* from its last to its initial position shown, the circuit breaker 22*f* is opened, de-energizing the holding coil 22*g* and releasing the demand sensing and record system in its initial position. The transitory contacts of the key 22*a*, like those of the key 21*a*, close only on the initial depression of the key and do not close as the key is returned from closed to open position.

(G) *Demand controlled recording*

In the preceding section the operation of the demand sensing equipment 22 has been treated as though no account of the ten thousand accounts sensed had reached its demand limit. In the system as shown in Fig. 4B, however, as above mentioned, the demand sensing bus 20*m* is arranged to interrupt operation of the system 22 and initiate recording of identifying data from the account mensers 12, 13 and 14 for any active account which has reached its demand limit as determined by the fan switch 20*a*. In the form shown the demand sensing bus 20*m*, when energized from the account bus 20*d* for a particular account through the fan switch 20*a* and when closed by closing of the demand sensing key 22*a*, puts into operation the demand recording system 23. This system comprises magnet switch 23*a* (lower right hand corner of Fig. 4B) which opens the power circuit for all of the system 22 except the holding coil 22*g*, and which also closes the restorer switch 23*b*. In the form shown demand sensing bus 20*m* returns to ground via printer initiating relay 23*c* (Fig. 4E) or print-punch initiating relay 23*d* (Fig. 4E), depending on the position of the printer-selecting switch 23*e* (Fig. 4E).

As above noted, each of the account menser groups 11 (Fig. 4A) has its mensers 12 through 20 preferably arranged in linear alignment as shown in Figs. 4B, 4C. The account number return busses 24*a* like the demand sensing bus 20*m*, extend across all the arcs 10*k* and are contactingly related to the contacts of the account number menser 12 of any particular account in any suitable manner by rotation of the shaft 11*a*. The trolleywise arrangement shown in Fig. 5 is suitable for this purpose. Similarly the name and address busses 25*a* and 26*a* extend past the name and address mensers 13 and 14 (Fig. 4A) of all accounts in the account bank 10*k*, Fig. 1, being similarly related to the mensers 13 and 14 of a particular account by the selector shaft 11*a* and its associated parts. Hence when a particular account has been selected by the selector 11 or the demand sensing system 22, the busses 24*a*, 25*a*, 26*a* (Fig. 4B) are energizable by the respective mensers 12, 13 and 14. As is shown in Fig. 4B and at the lower left corner of Fig. 4D, the account number busses 24*a* are connectable by suitable switch means shown as the pin blocks B, B' adapted to enter any selected positions in the companion blocks C, C' (Fig. 4E) to control respectively a corresponding number of printing or print-punching segments of the multi-column print and print-punching device (Fig. 4E). The name and address busses 25*a* and 26*a*, Fig. 4B, extend to switch means shown as the pin blocks B², B³ (Fig. 4D) and similar association through the companion block C (Fig. 4E) with selected elements of the printing device. The printing from the indicia mensers 12, 13, 14 (Fig. 4B) as hereinafter described under heading R is controlled by two current pulses in each columnar position and the mensers 12, 13 and 14 in each columnar position thus contain two contact elements. Hence to effect setting up of the printing segments to print the desired characters, the mensers 12, 13, 14 must be rotated through one revolution. The mensers 12, 13, 14 may be individually rotated or rotated in one or more gangs as by tying the mensers 13 and 14 together and using a common rotating means therefor. This rotating means in the form shown comprises rotation actuators 24*b*, 25*b*, 26*b* (Fig.

4B). In the preferred form these actuators, like the actuator 20*i*, are one-way cocking steppers which operate through ring gears and idlers to effect rotation of the mensers. To supply current to the actuators 24*b*, 25*b*, 26*b* the account busses 20*d* for all of the accounts in a given arc 10*k* are connected to an arc actuator energizing bus 24*c* (Fig. 4B). The returns from all the account number actuators 24*b* are carried in a common return bus 24*d* to the control keyboard group 25*c* (upper left corner of Fig. 4E) as is common return bus 25*d* from all the actuators 25*b* and 26*b*. The keyboard group 25*c* enables return busses 24*d*, 25*d* to be coupled to the printer pulsing output 25*e*, or to the print-punch pulsing output 26*e* in conformance with the connection of the reading busses 24*a*, 25*a*, 26*a* thereto.

Accordingly as the printer or print-puncher elements (Fig. 4E, hereinafter described) are put into operation by energization of the demand sensing bus 20*m* (Fig. 4B) pulses of current are fed to the actuators 24*b*, 25*b*, 26*b*, and mensers 12, 13, and 14 are rotated in synchrony with the operation of the printing mechanism to set-up therein indicia corresponding to that stored in the mensers.

As hereinafter described, the printer is preferably of the bail-following type in which the bail element swings first in one direction and then in a reverse direction to return to its initial position. Just as the printer bail (Fig. 4E) is about to reach its fully restored position following the printing operation, arm 23*f* moving with the bail closes stick switch 23*g* in any suitable fashion as by operation through a toggle 23*h*, so that this switch is closed by this final movement of the arm 23*f* but not closed during the movement thereof in the opposite direction. The stick switch 23*g* (Fig. 4E) when closed completes the restorer circuit 23*i* through the motor stop switch 23*m*, restorer circuit closer 23*b* (Fig. 4B) and a buzzer type current pulser 23*j*, to the actuator 20*i* for the "degree-day" drive gear 20*c*. The motor stop switch 23*m* (Fig. 4E) shorts the relay 23*c* or 23*d* stopping operation of the printer or print-punch mechanism with its motor 60*s* or 65*s* in its starting position, without interfering with the operation of the restorer circuit 23*i*. The actuator 20*i* is put into stepping operation by the circuit 23*i* through buzzer pulser 23*j* (which reduces or increases the current through magnet 20*i*, as its contacts open and close, and by way of idler 20*b* rotates the demand menser 20 throughout the remainder of its revolution from its pre-set limit to its zero position; i. e., throughout the portion of the menser contacts bridged by fan switch 20*a*. During this operation the resistance by-pass 23*k* around the buzzer pulser 23*j* passes sufficient current to maintain the stick switch 23*g* (Fig. 4E) in closed position but not sufficient current to interfere with actuation of the demand drive gear actuator 20*i* (Fig. 4B).

When the last contact of the menser 20 of the selected account passes from under the fan switch 20*a* the demand sensing bus 20*m* is de-energized. The stop-and-record switch 23*a* is therefore de-energized, opening the restorer circuit closer 23*b* and re-closing the power supply to demand senser 22. The demand sensing pulser 22*i* thereupon resumes operation until the operating arms 11*b* reach another active account in which the demand menser 20 has reached its pre-set limit.

As the closing of switch 23*g* (Fig. 4E), by energizing motor stop means 23*m*, causes motor 60*s* (or 65*s*) to stop just as the side contacts 62*a* (or 67*a*) associated therewith are opened, the de-energizing of lead 23*i* removing the short across the relays 23*c*, 23*d*, does not result in restarting of the motor pending another energization of lead 20*n*.

As is conventional in printing devices each operation of the printing motor may be caused to bring into printing position multi-copy continuous forms of delivery tickets or the like exemplified in Fig. 2 so that each actuation of printer may record thereon the account number and name and address of the customer requiring service or any other data pertaining to the particular account, registered in symbol form in the mensers 12, 13 or 14 or the like. For example one of the mensers may cause printing of a symbol designating COD delivery, charge account, quantity price or other guiding factor. Simultaneously or sequentially by use of well-known multihole coding mechanisms in the print-punch device, the account number or other coded items may be punched in the ticket form to enable it to be used with the senser hereinafter described for guiding posting to the account after delivery is completed.

After the scanning of the entire 10,000 accounts by the demand limit sensing means 22 (started by key 22*a*, and interrupted for the printing of a ticket for each service-demanding account, as just described) has been accomplished, the holding coil 22*g* is de-energized as above described, and the automatic preparation of delivery tickets is completed.

(H) *Delivery procedure*

The delivery tickets of Fig. 2 may be sorted and distributed to the drivers in route sequence, and in multi-copy form. When the deliveries are made, the truck meter may print or print-punch the quantity delivered and any other billing data needed on the ticket. Extensions based on such data may be computed and recorded on the ticket by the truck meter, or such extensions may be made for a group of returned tickets by use of the senser and computer mechanisms of the present invention, so that the delivery ticket, and delivery records thereon, may be employed to automatically select the correct account, or accounts, automatically post the extensions to the balance mensers thereof, automatically record and post the data to the daily journal and its balance mensers and to stock control registers, if desired, and perform any other desired function therewith, which functions will now be described.

(I) *Balance mensers*

As shown in Fig. 4C each of the account groups 11, Fig. 4A, comprises a group of balance mensers, one for each column of the balance figure for the account. In the form shown five of these mensers numbered 15 through 19 are employed capable of handling debit amounts up to 999.99 and credit amounts to the same extent.

Each of these mensers may take any desired form but preferably has the form shown in Fig. 5 or equivalent. In the form shown in Fig. 5 each menser 90 comprises at one end a ten-toothed gear section and, spaced along its body portion, ten longitudinally displaced teeth or contacts helically arranged. The balance menser busses 27*a*, 28*a*, 29*a*, 30*a*, and 31*a* (Fig. 4C) extend across all the arcs 10*k*, Fig. 4A, and are arranged to be placed in contacting relation to the ten contacts of the associated members 12 through 19 in any suitable manner as by the trolleywise arrangement shown at 90*e* in Fig. 5 and hereinafter described. Thus, depending on the position of the menser 15 (Fig. 4C) of a selected account, for example, one of the ten busses 27*a* will be energized, etc. The busses 27*a*, 28*a*, 29*a*, 30*a*, 31*a*, as shown in Fig. 4C, pass downwardly through a multipoint three-position gang switch 27*c* (shown extending clear across the center of Fig. 4C) together with the return bus leads 27*d*, 27*d'*, etc., of the forward and reverse menser-turning actuators 27*b*, 28*b*, 29*b*, 30*b*, 31*b*, the common terminals of which are connected to the arc actuator energizing bus 24*c* (Fig. 4B). This multipoint three-position gang switch 27*c* in its central position shown, connects the balance menser busses in cables 27*e*, 28*e*, 29*e*, 30*e* and 31*e* respectively through the debit or credit balance and zero elimination circuits and the scanning elements of Fig. 4D to suitable switching means, as the blocks B4, B5, Fig. 4D, for controlling the printer or print-punch device (Fig. 4E). Thus the central position of the gang switch 27*c*, Fig. 4C, enables recording or other application of the balance data carried by the mensers 15 through 19 of any selected account.

(J) Pre-posting carry and borrow sensing

The multipoint three-position gang switch 27c may be shifted to the left in Fig. 4C by a magnet actuator or relay 27f, which is energized from the arc actuator energizing bus 24c under control of an "add key" 27g in the control keyboard (see Fig. 4F). Similarly switch 27c may be shifted to the right in Fig. 4C by magnetic actuator 28f under control of the "subtract key" 28g (Fig. 4F).

When in the left-hand add position, the leads 27a, 28a, etc., are connected through "Pre-Carry" pilot circuits 27h, 28h, etc., which are cross-connected by linear networks of rectifiers 27i, 28i, etc., so that current supplied through one of the contacts of the menser 15, for example, will energize its lead of the pre-carry pilot circuit 27h and all leads therein of lower numerical value. Of course, the same energizing principle applies to the leads 28h, 29h, etc., associated with the other digit busses 28a, 29a, etc.

In the right-hand position of the switch 27c, Fig. 4C, the leads 27a, etc., are connected through "Pre-Borrow" pilot circuits 27i', 28i', etc., which circuits are cross-connected by similar linear networks of rectifiers 27j oriented in the opposite direction so that energizing of one of the leads 27a will energize its pre-borrow pilot lead 27i' and all pre-borrow leads of higher value. Similar pre-borrow arrangements are made in each of the other digit groups of the menser busses 28a, 29a, etc.

The pre-carry pilot circuits 27h of digit value 1, 2, 3, 4, 5, 6, 7, 8 and 9 are respectively connected to the pre-borrow pilot circuits of digit value 8, 7, 6, 5, 4, 3, 2, 1 and 0, and each of these pre-carry and pre-borrow pilot circuits, except the pre-borrow circuit of digit value zero, contains an isolating means, as one of the downflow rectifiers 27k. These same arrangements are made with respect to the pre-borrow and pre-carry circuits derived from the menser busses 28a, 29a, 30a, 31a. The common leads from the inter-connected pilot circuits are carried in cables 27m, 28m, etc., to the pre-carry and pre-borrow controls of the posting mechanism (Fig. 4F).

(K) Posting mechanism

In the preferred form of Fig. 4F the posting mechanism is exemplified by posters for three columns of a multicolumn installation. When a five-column installation is employed (cf. Fig. 4C) five column posters 40, 41, 42, 43, 44 are used as indicated just above the center of Fig. 4F. As the intermediate column posters 41 and 42 are each duplicates of ten-column poster 43, these are omitted for simplicity in Fig. 4F.

In the form shown the cabled carry pilot busses 27m, 28m, 29m, 30m, 31m (Fig. 4C) enter at the upper right-hand corner of Fig. 4F. The units pilot leads 31m connect to the right-hand contacts of the key bank 44 in the order indicated adjacent key bank 43.

The key banks 40—44 each comprise key positions one through nine (indicated on key bank 43 by the numbers applied to the electromagnets 46), and the depressing of one of these key positions closes two electrically independent contacts, which for convenience are shown at the left and right of the magnets 46 respectively. The left-hand contacts control the positioning of the mensers 15, 16, etc. (Fig. 4C), to reflect the change in the columnar digit produced by adding or subtracting the digit value set up in the corresponding column of the key board 40–44. The right-hand contacts pre-determine, in the case of addition, whether the value to be added taken with the column value already in the menser, and with the unit of increment, if any, produced by carry from the column of next lower value, should produce a carry into the column of next higher value.

Conversely, in the case of subtraction, the right-hand contacts determined whether the value in the menser of the column, less any unitary increment, borrowed for the column of next lower value, is less than the value to be subtracted in that column, to predetermine whether borrowing of one unit from the column of next higher value will be necessary.

The ten's and other leads 30m, 29m, 28m, 27m connect to the right-hand key banks of the columns 43—40 in similar fashion, by way of increment switches 43a—40a hereinafter described.

In the case of the units column 44, no carry or borrow is involved, so no incrementing switch such as the switch 43a is required. All the other columns, as columns 43, 42, 41 and 40 are subject to carry and borrow operations, and hence are provided with incrementing switches 43a—40a. The incrementing switch 43a, when its actuating relay 43c is not energized, rests in the position shown in Fig. 4F. It is a ten-point double-throw switch, and in this position connects the nine leads of cable 30m in the sequential order indicated adjacent thereto. When the relay 43c is energized, switch 43a connects pre-carry pilot lead #9 P. C. (pre-borrow pilot leads #0) of cable 30m directly to the common bus 43b of the right-hand contacts of bank 43, advances all the other connections from the leads of 30m one position, and connects the lead 44b, by which relay 43c is energized, to also energize the pre-carry #1 P. C. (pre-borrow #8 P. B.) position associated with the key-bank position #9.

The incrementing switches 42a, 41a, 40a are similar to switch 43a, and associated in the same way with the leads from the cables 29m, 28m, 27m, and with the leads 43b, 42b, 41b, respectively.

The operation of these incrementing switches may be best understood by considering specific examples, as follows:

Assume that 37 is to be added to a prior balance of 55. Key #3 of the ten's bank 43 is depressed, and key #7 of the units bank 44. As the units menser 19 (Fig. 4C) is connected by depressing the "add" key 27g (Fig. 4F), it will energize the fifth lead of the busses 31a (Fig. 4C) and through the rectifier network below switch 27c, all leads of lower value thereof. Thus the closing of the right-hand #3 P. C. lead contact (in position #7 of key bank 44) will energize the carry posting lead 44b. This will have two results: (1st) It will operate the incrementing relay 43c to shift the increment anticipating switch 43a; (2nd) it readies the side contacts 44d of the units poster (upper right-hand corner of Fig. 4F) to energize pre-carry relay 43e of the Tens poster (upper center of Fig. 4F) for completing to ground the circuit of menser actuating bus 43f to produce one step operation of the add actuator 30b for the Tens menser 18 (Fig. 4C) as and when pre-carry actuation of the posting mechanisms 40—44 is initiated.

As the ten's menser in column 18 (Fig. 4C) will be energizing only the fifth and lower value leads of busses 30a, the closing (in Fig. 4F) by the key #3 in the ten's bank 43 of the right-hand contact associated with the #7 P. C. lead of the group 30a (or rather the #6 lead due to actuation of the carry anticipating switch 43a) will not energize the carry posting lead 43b. Therefore no current will be supplied therethrough to side contacts 43d of the Tens poster for actuating pre-carry relay 42e (omitted but corresponding, in the Hundreds poster, to the pre-carry relay 43e in the Tens poster) and no shifting of the incrementing switches of higher column value occurs.

Again assume that 37 is to be subtracted from an account balance of 55. The same keys are closed as before in key banks 43 and 44. As the units menser 19 (Fig. 4C) is connected by depressing the subtract key 28g (Fig. 4F), it will energize the fifth borrow pilot lead of the busses 31a (Fig. 4C) and also borrow pilot leads thereof of higher digit value. But since these leads connect to the right-hand contacts in units key bank 44 (Fig. 4F) in reverse order as compared to the carry pilot leads, the closing of the right-hand #6 P. B. lead contact is effected by the seventh key in that key bank and the borrow lead 44b is energized.

Energizing of the lead 44b results: (1st) In operating the increment relay 43c to shift the incrementing switch 43a in the Tens column; and (2nd) in readying the side contacts 44d of the units poster to energize the borrow posting relay 43e af the Tens poster. The incrementing switch 43a in this instance, by virtue of the reversed order of the borrow connections of leads 30m, connects the #3 P. B. lead of group 30m, to the position closed by key #3 of key bank 43. As the Tens menser 18 (Fig. 4C) is energizing only leads #5 P. B. to #8 P. B. of the Tens group 30m, no current is supplied to the borrow lead 43b. The relay 43e, when closed on the pre-borrow operation of the units posting mechanisms 40—44, by virtue of the reversal by switch 27c of the connection of leads 43f—43g, etc., (at the center of Fig. 4C) with respect to the leads 30d, 30d' (Fig. 4C), operates the actuator 30b in reverse direction, and thus may pre-borrow one unit from the Tens menser 18 before the posting of the column digit thereto commences.

It will be appreciated that in a five-column arrangement such as that shown in Fig. 4C positive amounts up to $999.99 may be accommodated. Conversely negative amounts to the same limit may be represented by complements thereof in the mensers 15 through 19. If more columns are provided, larger positive and negative amounts may be registered within the capacity of the machine.

(L) *Credit and debit limit indication and posting control*

As is shown at the upper left-hand corner of Fig. 4C, the illustrative embodiment is provided with a credit and debit limit indicator 47. This indicator may be in the form of a menser similar to the mensers 15 through 19 or in the form of a skeleton menser having only a neutral or zero position thereon with digit nine and digit one contacts at the respective sides thereof. These contacts in the form shown are connected respectively to credit balance lead 47a and debit limit lead 48a (Fig. 4C), preferably in the manner hereinafter described in connection with Fig. 9.

The credit balance lead 47a, as is shown at the upper left-hand corner of Fig. 4D, connects through a signal light or the like 47b to a return bus 47c, and also connects through the line 47d to the actuator 47e of a multipole double-throw switch 47f hereinafter described. From the line 47d a lead 47g also runs to the credit printing side contacts 47h and thence to the balance-printing switch B-4 hereinafter described.

The debit limit bus 48a, Figs. 4C and 4D, connects to the debit limit light or indicator 48b (Fig. 4D) and to the debit lock-up line 48c for locking up the machine whenever the debit limit of an account has been exceeded as is disclosed further on in this section "L." The switch 48c' connects the lock-up pilot circuit branch 48c for operation, and the circuit breaking push button 48c" may be employed for opening this lock-up circuit branch for testing, etc. The credit balance return 47c, as shown on Fig. 4F, connects to the return side of the power source 50 independently of the lock-up or power cut-off switch 49.

Referring again to Fig. 4C, it will be seen that the limit menser 47 is provided with actuating means 47k in all respects similar to the actuators 27b for the menser 15. The forward and reverse leads from the actuator 47k are automatically connected through the multipole switch 27c to a limit actuating bus 47m, Fig. 4C and top of Fig. 4F, which is adapted to be closed to ground by a carry-borrow relay 47n similar to the carry-borrow posting relays 40e–43e. This relay 47n is adapted to be actuated by a pre-carry operation of the poster 40 (Fig. 4F) effected by energization of its carry anticipating lead 40b.

The carry anticipating lead 40b is also arranged to produce lock-up of the entire posting system as the posting mechanism anticipates that the entry of the figure set up on the keyboard 40–44 will produce one of the following changes in the mensers 15–19 and 47 (Fig. 4C); (1) a change from a positive balance to a negative balance in mensers 15–19, involving a shift from zero to #9 position in menser 47; (2) a negative overrun in mensers 15 through 19, involving a shift from position #9 to the non-existent position #8 in menser 47; (3) a shift from a negative balance to a positive balance in the mensers 15–19, involving a change from the complement nine to the zero position in the menser 47; (4) a debit overrun in the mensers 15–19, involving a change from the zero to the #1 position in the limit menser 47. It will be appreciated from the preceding description that each of these anticipated limiting conditions involves a prospective change in the position of the limit menser 47 and hence a prospective change in the indication of the signal means 47b, 48b (Fig. 4D) controlled thereby.

By the connection of the line 40b (Fig. 4F) to a stick relay 49 which has its return connected through the circuit breaking push button 49b to the permanent return line 47c, the anticipation by the key bank 40 (Fig. 4F) of the necessity of carrying to or borrowing from the limit menser 47 energizes the relay 49a and disconnects the power circuit returns from all portions of the apparatus except the limit indicating means 47b, 48b and the poster key-bank clearing lead 49c (lower center of Fig. 4F).

This lock-up action, among other things, disconnects the return from the poster driving relay 47p (center of Fig. 4F, which preferably is of the buzzer type and preferably has to move the ratchet 47r through several steps to move the arm 47q from one of its positions to the next, this or some equivalent provision being made to assure operation of the relay 49a) when lock-up is effected thereby, before the arm 47q reaches its pre-borrow or pre-carry transferring position.

When this lock-up occurs the operator may simply glance at the credit balance lamp 47b. If she is "adding" and the credit balance lamp is lit, she knows the posting may be proceeded with as it will simply convert the amount in the mensers 15 through 19 from a complement to a positive amount within the limits of the machine. Similarly if she is substracting, and the credit balance light is not lit, she knows the converse will be true and that she is to continue the posting. If she is adding and neither light is lit, she knows that to continue with the posting will exceed the capacity of the machine (which would be indicated, if the entry were made notwithstanding, by lighting of the debit limit lamp 48b). Similarly, if she is subtracting and the credit balance light is lit, she knows that to continue the operation will exceed the credit balance limit of the machine (which would be indicated, if the operation were continued notwithstanding, by the going out of the credit balance lamp 47b).

In the first instances, where the operation may safely be proceeded with, the operator need merely depress the lock-up release key 49b (bottom of Fig. 4F), breaking the circuit of the stick switch 49a and reestablishing the common ground return through switch 49.

In the other instances where posting cannot be safely proceeded with, as the lock-up has been effected entirely in anticipation of the pre-transfer and pre-posting operations, the operator may simply depress the keyboard clearing key 49d (center of Fig. 4F) to release the amount posted in the keyboard. Now with no amount to be added the operator may depress the lock-up release key 49b whereupon the switch arm 47q will be stepped around through one complete revolution and back to its initial position. On the last step before it reaches its initial position the closing of the contacts 47t will release the previously depressed "add" or "subtract" key 27g, 28g, thereby stopping the arm 47q in the position shown. The previous balance in the selected account may now be printed, as hereinafter described, and with the item representing the transaction which could not be entered without exceeding the capacity of the machine, may be posted to a special ledger or special ledger section of the machine capable of receiving the same.

Thereafter the balance in the mensers 15-19 of the selected account may be raised in the machine to a value which will light the debit limit light and effect lock-up if any attempt is made to print a balance from said account. Thus, in any subsequent statement printing operation or the like, whether manually or sequentially controlled, a lock-up will occur indicating to the operator that the balance in the particular account must be sought in the special overrun ledger.

(M) Posting operation

Returning now to the situation in which no lock-up occurs, or in which it is safe to enter an amount following a lock-up, the actual entering operations proceed as follows: When the buzzer stepper 47p (energized through the "Add" or "Subtract" keys 27g or 28g adjacent it in Fig. 4F); has moved the arm 47q from its inital position shown to its transfer position, power is supplied through contacts 47u and contacts 47v to operate the direct acting stepper magnets 51 (Fig. 4F) and turn the switch arms 52 one step counterclockwise in the form shown. This initial movement of the switch arms 52 closes the side contacts selectively energizing the relays 40e-43e and 47n in each column which is to be subjected to a pre-carry or pre-borrow operation. At the conclusion of this initial movement the contacts 47v are opened and connections from the leads 40f, 40g, 41f, 41g, etc., to the arcuate busses 47h, 47i, etc., respectively, are established.

The posting contacts shown at the left of the key positions 1, 2, 3, 4, 5 in the key banks 40-44 are connected respectively to side contacts with the arcuate busses 47h, which are lifted open sequentially by the stepping of the arms 52 following the pre-carry step thereof. The remaining posting contacts, shown at the left of the key positions 9, 8, 7, 6 in the key banks 40-44, are connected through side contacts ganged with the 1, 2, 3, 4 contacts, to the arcuate busses 47i.

Concurrent with the pre-transfer step of the arms 52, (as they pass the side contacts 40d to 44d, Fig. 4F) the lock-up circuit 40b is broken at 52a (upper left corner of Fig. 4F), and the restore circuit cut-offs (hereinafter described) are closed at 52b in each poster.

Following the pre-transfer step of the arms 52, the stepper 47p moves the arm 47q sequentially across five sets of contacts 47w, thus making and breaking the common return circuit of the direct acting steppers 51. Each of the steppers 51 is thus intermittently actuated by current derived from the arc bus 24c (Fig. 4c) through the respective actuators 27b, 28b, etc., the leads 40f, 40g, etc., the arcuate busses 47h, 47i, and the side contact thereof which is connected to the stepper 51 by the selected left-hand contact of the key bank 40, 41, etc. Thus as each arm 52 steps along, pulses are sent through the appropriate lines 40f, 40g, etc., to move the associated mensers forward one, two, three, four or five steps (if key 1, 2, 3, 4 or 5 of the key bank 40, etc., is depressed) or backward one, two, three, or four steps if key 9, 8, 7, or 6 of the respective key bank is depressed.

When the arm 52 for each column arrives at the position which breaks the connection between the selected key of the key bank and the arcuate bus 47h or 47i, the particular actuator 51 stops. Thus no more than five steps of actuation of the arms 52 is required to reflect entry of any digit in the associated column.

Where a zero occurs in the figure being entered, no key of the corresponding bank 40, 41, etc., is closed, so no posting operation of the associated stepper 51 occurs after its initial pre-transfer actuation.

When the stepper 47p has moved the arm 47q across the five column posting contacts 47w, it returns it to its initial position. As the arm 47q passes to this position it closes contacts 47t to stop the arm 47q in its initial position as above described. If the automatic clear switch 47x is closed, the clearing magnet 47y is simultaneously energized, clearing the keyboard 40-44. If the switch 47x is open, the amount entered on the keyboard 40-44 may be retained therein for posting to other accounts, or other purposes.

When the closing of the contacts 47t releases the "add" or "subtract" key 27g or 28g, the switch 27c (Fig. 4C) returns to its central position. In this position a circuit from lead 51a (Figs. 4B, 4C, 4F) is completed through double-pole relay 51b (Fig. 4F). The actuation of this relay 51b closes a circuit from power lead P through a buzzer pulser or the like 51c to the steppers 51 by way of the cut-off switches 52b, and connects the return side of the steppers 51 to ground, in the form shown. The operation of the pulser 51c then actuates the respective steppers 51 to restore the arms 52 to the position shown. As the arms 52, respectively reach the position shown their associated cut-off switches 52b are opened, and they are brought to rest. The rectifiers 51d prevent bypassing of current from an operating actuator 51 to one which has completed its restoring function.

(N) Senser actuation of poster keyboard and account selector

As above mentioned, the keys of the key banks 40-44 (Fig. 4F) may be actuated manually or automatically. In the form shown the automatic actuation is effected by a series of electromagnets 46, one for depressing each key of each column, which are energized from the "1 of 9" outputs 53 of the "2 of 5" sensers 53a shown near the bottom of Fig. 4F.

The "2 of 5" sensers 53a are adapted to cooperate with print-punch coded records, such as those produced by the print-punch mechanism, Fig. 4E, hereinafter described. In the form shown the power lead P is connected to the base contacts of the senser units 53a. The brush contacts, either directly or through relays, as shown, are connected to operate in pairs related in series to energize one or another of the ten descending leads depending on which pair of perforations is sensed. By appropriately relating the record perforations and the senser connections, pre-determined pairs of perforations may be set up to energize the #1 to #9 leads respectively. The #0 lead does not need to be employed in automatic operation of the key banks 40-44. Thus this lead, from an extra column in the senser, or any other sensable contact, may be employed to actuate a relay, similar to one of the relays of the bank 46, to automatically close the "add" or "subtract" key 27g or 28g, as will be understood by those skilled in the art. The operation of releasing the key 27g, or 28g, or any conventional device, may be employed to step the senser feeding mechanism to feed the ensuing punched record thereto. The switch or contact 45, Fig. 4F, when open, deenergizes the magnet banks 46 operated from the sensers 53a; while in its closed position, the senser 53a may actuate the magnets 46. Thus when the posting from sensed digits cannot be safely proceeded with (see end portion of Sec. L above) and clearing key 49d is depressed, the switch 45 may be employed to hold the keyboard clear when the release key 49b is closed if it is desired to retain the punched record in the senser 53a while transferring the balance of the account to which it could not be posted, to the special ledger or special section, as described.

As indicated at 54 in Figs. 4F and 4G the leads 53 may be energized by calculator output on a "1 of 9" or "1 of 10" basis as indicated, and this output may be fed through the "2 of 10" pulser (prepulse plus "1 of 9," hereinafter described) for operating the printers via plug connector B6 (Fig. 4F) and printer inputs C or C' (Fig. 4E).

A senser similar to 53a (Fig. 4F), connected to magnet banks similar to the magnet banks 46, but associated with the account selector keyboard 11u, 11w—11w' 11x—11x', 11y (Fig. 4A), may be employed to automatically select the particular acount in which the automatic posting is to be effected, and the closing of the contacts 47t (center of Fig. 4F) may actuate the account selector clearing bar 12v (Fig. 4A) by energizing solenoid 12q or by other suitable means. Similar selections and controls may also be established with respect to other functions (see section V).

The output of these sensers may also be converted into "2 of 10" pulsations (prepulse plus "1 of 9") for actuating the printer, print-punch mechanism, or the recording devices as hereinafter described (see sections Q, V).

The center and corner pattern of perforations shown (at 65b in Fig. 4E and in the magnets associated with sensers 53a near the bottom of Fig. 4F) is preferred, but with less advantage the perforations may be arranged in longitudinal rows or otherwise. Since two perforations must come into play to effect the operation of the senser 53a, both as respects right-zeros and integers, it will be appreciated that any contact failure that may occur will be easily detected, and further, that in cooperation with the elements 61—61b, or 66—66b, Fig. 4E (hereinafter described), any failure of one of the two contacts will produce lock-up of the recording mechanism, and thus be self-detecting.

(O) *Deriving debit balances and true credit balances*

As above noted, when neither one of the "add" nor "subtract" actuators 27f and 28f (Fig. 4C) is energized, the multipoint three-position switch 27c connects the menser reading busses 27a, 28a, etc., to cables 27e, 28e, etc. (shown passing from the bottom of Fig. 4C to the top of Fig. 4D where they are distributed to the multipole double-throw switch 47f, which is normally in the position shown and shifted to the right when actuator magnet 47e is energized by current supplied from the "credit balance" lead 47a, 47d.

In the debit position shown, the busses pass through the sections 32a, 33a, etc., in normal order to the true output sections 32e, 33e, etc., Fig. 4D.

In the credit position (when magnet 47e is energized) the leads 31e from the units column are transferred as shown in the section 36a so that the output lines 36b energized from the #1 to #9 leads 31a, 31e, respectively, are the ten-complements of the normal values of those leads, the #0 lead of group 31a being employed for "fugitive-one" elimination as hereinafter described. As the ten-complement of the units column of a credit balance complement in the mensers 15–19 (Fig. 4C) is the true value for this column in all circumstances, the #1 to #9 leads of the output lines 36b are connected directly to the true output section 36e.

In the other columns, in the form shown, all the leads from #1 to #0 of the groups 27e, 28e, etc., are in the "credit" position, transferred in the sections 32a, 33a, etc., so that the output lines 32b, 33b, etc., energized from the respective leads of the groups are the nine-complements of the normal values of the leads.

The ten output leads 35b of the "tens" group pass through a complement shifting switch 35c. The switch 35c is operated by a magnetic operator 35d energized from the #0 lead of units group 31e when and only when a zero appears in the units column of the credit balance complement in the mensers 15–19 (Fig. 4C). This switch 35c serves the dual purpose of shifting the nine-complement connections of the #1 to #9 leads in the section 35b to ten-complement connections thereof, before they reach the output section 35e, and of shifting the output-#9 lead of the section 35b (energized in the nine-complement position from the #0 lead of the group 30e) to connect it to magnetic operator 34d. Thus when zeros appear in both the units and tens columns of the menser complement, the complement shifting switches 35c and 34c are both shifted, and the "fugitive one," which would otherwise appear in the "hundreds" column, is eliminated.

The shifter 34c and magnetic actuator 34d are similar to 35c and 35d, previously described, as are the remaining shifters and actuators 33c, 33d, 32c, 32d, etc.

To provide for the recording of a predetermined number of zeros (herein two of them) to indicate the presence of a zero balance in the mensers 15–19 of a particular account, notwithstanding the practice of left zero elimination herein provided for, the debit-#0 lead of the group 30e in its normal position shown, connects to a zero-record pilot lead 35f, which is associated with the true output leads in the section 35e as hereinafter described.

From the foregoing it will be clear that when the mensers 15–19 of a particular account contain a debit balance, of say 50555, the fifth lead of column 32e, 34e, 35e, and 36e will be energized and no lead of column 33e will be energized, the corresponding condition being true for other menser-registered positive amounts.

When the mensers 15–19 contain a credit balance of, say, 946; i. e., register the complement 99054, the limit menser 47 (Fig. 4C) is in "credit" position. Under these circumstances the leads of sections 32e, 33e, etc., which will be energized will be as follows:

32e—none
33e—none
34e—ninth
35e—fourth
36e—sixth, and these leads are thus available to actuate a recording means to record the true credit balance.

(P) *Converting "1 of 10" true outputs to pulsed outputs on "2 of 10" (prepulse plus "1 of 9") basis*

As above mentioned and hereinafter described, the recording means herein are exemplified by printing and print-punch devices operating under pulse-control on a "2 of 10" basis, and which, in each of their series of pulses, operate stepper means controlling the supply of pulses thereto from various sources, herein exemplified by the above described indicia mensers (Fig. 4B), balance mensers (Fig. 4C), and by senser converters (Figs. 4D and 4F).

In the form shown in the lower portion of Fig. 4D, the #1 to #9 true output leads of each of groups 32e, 33e, etc., are respectively connected, in order, to the contacts of nine-point switches having arms 32f, 33f, etc. In addition all of the leads of each group are connected to side contacts of multipole contactors 32g, 33g, etc. The arms 32f, 33f, etc. (which are shown just entering their initial position) are ganged and driven by a cocking stepper actuator 37 (lower right-hand corner of Fig. 4D) which receives its current from the power bus P and has its return lead 37a associated, through the key bank 25c (Fig. 4E), with a selected one of the recording devices there shown, by which the return circuit 37a is completed and broken ten times in the form shown, to actuate the cocking stepper 37 (Fig. 4D) through ten steps corresponding to the nine points of the switches driven thereby plus return to the initial position being entered in Fig. 4D.

When the switch arms 32f, 33f, etc., rest in their initial position, they connect the left zero elimination bus 38 to the common leads of the multipole contactors 32g, 33g, etc., and hold these contactors in engagement with their side contacts. The bus 38 joins all the arms 32f, 33f, etc., when they are connected to the common leads of contactors 32g, and for left-zero elimination rectifiers are interposed in the sections of bus 38 between the respective arms 32f, 33f, etc., and the next adjacent switches 33g, 34g, etc. Thus the current from the most left-hand column in which one of the nine integer leads is energized may supply current to the leads 32g' from the arms 32f, 33f, etc., to the right thereof, but not to those to the left thereof. In this way, in the initial position of the arms, current is supplied through the recorder operating leads 32g' of all columns containing energized integer leads, and all columns to the right thereof.

On operation of the cocking actuator 37 the arms 32f, 33f, etc., step around the associated switch point positions and send current down their individual lines 32g', when the energized leads, respectively, are reached.

As above noted, to insure recording of a double-zero (00) when a zero balance appears in the mensers 15–19 (Fig. 4C) the zero lead from the menser 18, through cable 30e, is in debit position connected to an extra side contact of the switch 35g (Fig. 4D) to initially supply current to the leads 32g' extending from the switches 35f, 36f, when no integer leads of the system are energized.

As was also mentioned above, when a true credit balance has been derived from a registered complement, it is desirable to indicate the fact that it is a credit balance in the record made thereof, and this is effected by the connection 47g (Fig. 4D) extending from the credit balance bus to the two side contacts 47h located to be closed in the first and second of the nine contact positions of the switch 36f, which send pulses down the line 47i to control the printing of a credit symbol, exemplified in the second position of the second zone of the printer in Fig. 4E, hereinafter described. In the form shown, the pulsing output leads 32g' and 47i lead to suitable switching means exemplified by the connector blocks B4, B5 (Fig. 4D) to enable these outputs to be associated with various recorders, as by the companion connector means C, C' (Fig. 4E), (see Part V).

In the connector blocks B through B9 (bottom of Fig. 4D), block B is for the account number. If 10,000 accounts being handled (#0000 to 9999), B can be a 4-pronged connector, one for each column. Block B1 is a duplicate of B. Block B2, for the name, will have as many prongs as there are letters and spaces in the longest name to be accommodated. Block B3 will have as many prongs as there are letters and spaces in the longest address to be recorded. Block B4 will have as many prongs as there are numbers in the largest balance to be stored (6 prongs for a 6 figure balance) plus one additional prong for the credit balance lead 47i, etc. The symbol (digit or letter) to be signalled on each prong is always signalled by a combination of two pulses time spaced in two of 10 possible time space positions.

In Fig. 4E, the printers, as hereinafter described, have say, eighty type segments, one for each space in a line to be printed, each controlled respectively from a different contact of the cooperating connector C, through a lead $C^2$ individual to that contact and that printing segment. Each type segment 60a (only one of which is shown in Fig. 4E) carries a complete set of letters, digits and other desired printing symbols. Therefore, each can respond to the signals supplied over whatever prong of connectors B through B9 may be connected with its contact in connector C. By selecting the order and the relative positions at which the connectors B through B9 are plugged into the cooperating connector C, the order and position at which the account number, name and address, and balance will be printed in the line, may be selected to fit the forms to be printed.

In the same manner, each contact or connector C' (Fig. 4E) is connected separately to a separate type segment (one such connection being shown at $C^3$), and the position of plugging the connector B (or B1) and B4 (or other numerical digit connector) on connector C' will determine at what position the number will be printed and coded on the form.

(Q) *Alternative converting means*

Converting means similar to that just described is also employed to enable the senser outputs (Fig. 4F) and the computer outputs (Figs. 4G and 4F) to operate the recorder. In these instances no left-zeros are to be dealt with, and a simplified converter may be employed as shown in Fig. 4F. In this case the switches 32h, 33h (omitted), etc., are similar to the switches 32f, 33f, etc., in Fig. 4D, but the zero energized leads 53b from the sensers are employed as current leads and associated with rectifiers or like one-way current devices to provide the initial actuating current in each column independently of any other column. The one-way current devices in the form shown comprise connections to the zero-energized leads 53b, respectively, of all the integer leads of the associated group through rectifiers or the like 53c.

The switch arms 32h, 33h (omitted), etc., which are gang driven by the cocking stepper 37b, in their initial position make contact with the prepulse leads 53b. As a result, the energizing of either the zero or one of the integer leads in any column, will impart an initiating current to its associated lead 53d before operation of cocking actuator 37b commences. Thereafter, when the arms 32h, 33h (omitted) etc., reach integer leads which are energized, a current is again sent down the recorder-controlling lines 53d, respectively. As the sensed record itself need contain no punch-coded symbol in left-zero positions, no provision for eliminating left zeros is needed. As the sensed record itself will usually contain zero-balance coded symbols, no other provision for zero balance recording is required. As the computer leads 54 are preferably energized in like fashion to the senser leads, the same is true with respect to computer outputs. If menser-like forms of computer output are employed, these may control converters similar to that shown in Fig. 4D, previously described.

(R) *Exemplary recorders*

The recording elements of the system are herein exemplified by printing and print-punch devices (Fig. 4E) peculiarly, but not exclusively, adapted to function in mutually controlling manner with menser or senser outputs of the types herein disclosed.

As shown at the right-hand side of Fig. 4E, the printer device comprises a controlling bail 60 followed in its forward sweep by a multiplicity of type segments 60a. In Fig. 4E one such segment is shown, and a large number of duplicates thereof are to be understood as arranged adjacent thereto along the printer axis 60b. As each segment prints one character and the whole operating group is simultaneously printed, the group prints a complete line of characters at once. Means is included to provide for positioning of the printed line in various locations, herein by providing a considerably larger number of type segments 60a, say eighty thereof, than will be used at one time, the controlling means for the several segments being taken out to the terminal block or switching means C, so that any of the sources exemplified at B, B', $B^2$, etc. (Figs. 4D and 4F) may be associated with any group of adjacent type segments.

The type segments 60a in the form shown, have set-up controlling elements 60d divided, as shown, into nine zones, containing, respectively, 9, 8, 7, 6, 5, 4, 3, 2 and 1 interzone positions. The last interzone position in each zone preferably coincides with the zone selecting position or stop 60e for the ensuing zone.

Each type segment controller 60d also comprises zone selector means operable by the first flow of current from any selected one of the above mentioned sources to select the zone desired, as well as intrazone selecting means to stop the segment in a particular position in the selected zone. In the form shown these means comprise a one-way escapement pallet 60f operating on a ratchet rack 60g, which is provided with a zone selecting dog 60h mounted to be pivoted, on the initial step of movement of the rack 60g, to project its end 60i into the path traversed by the zone stops 60e. The dog 60h, which may be spring-biased, normally rests in the position shown, and as rack 60g descends is tilted clockwise as viewed in Fig. 4E by the stop 60j. Once the dog 60i is engaged under zone stop 60e, it is held in position by friction or otherwise. On return past the stop 60j, dog 60i may be tilted counterclockwise and may drop back to the position shown after clearing the stop 60j. During such return of the rack 60g, the one-way escapement pallet 60f rides over the inclined rack teeth allowing it to move to the position shown without hindrance.

As the bail 60 swings counterclockwise from its initial position shown, the type segments, supported by the longitudinal bail-bar 60k, and appropriately spring-biased, follow along behind it. The racks 60g, which were brought to their initial positions shown by contact of projections 60m with bail-bar 60n, are retained in the position shown until released by the initial operation of the escapement pallet 60f.

The pallet 60f is operated by a magnetic actuator 60p, which is put into and taken out of operation by a control switch 60q shifted by control stepper 60r, in response to the two flows of current received from the controlling lead $C^2$ connected to the connector means C, switch 60q (and switch 65q) in the form shown is a rotary switch stepped around an axis x—x.

The bail 60 is swung first counterclockwise to the limit of its movement (which allows any unarrested segment 60a to proceed beyond the printing positions thereof) by a suitable drive means 60s. This drive means at or near the end of this throw may initiate the impressing of the arrested type faces on the sheet, card or other record to be printed in any desired or conventional manner. Following this recording operation the drive means 60s, either by reversing its direction of operation or through an appropriate mechanical movement, swings the bail 60 clockwise to its initial position, thus restoring the parts to the location indicated.

As the bail moves counterclockwise, its operating element 60t sequentially engages and closes contacts 60u, thus connecting return line 60v to grounded bus 60w once for each contact, or ten times in all. These circuit closings perform two functions: firstly, they complete the return circuit 25e and hence step along such menser- or senser-actuators—cocking actuators 24b, 25b, 26b (Fig. 4B); 37 (Fig. 4D); 37b (Fig. 4F)—as have their returns associated with lead 25e by the keybank 25c (upper left corner of Fig. 4E); secondly, they also complete the return circuit 60x from the actuator and control stepper 60p, 60r in synchrony therewith.

In the initial position shown the control lead $C^2$ is connected to the control stepper 60r and the escapement actuator 60p. Thus when closing of contacts 60u, by way of lead 25e, finds menser 12, 13 or 14 (Fig. 4B) in such position that a pulse is sent down one of the leads 24a, 25a, 26a (associated with one of the leads $C^2$, Fig. 4E, by switching means B, $B^2$, $B^3$, Fig. 4D) when the contact 60u is closed, controller 60r is cocked, and at the same time escapement actuator 60p is cocked, dropping rack 60g a half-step and tilting dog 60i into zone-stop engaging position. If this occurs when the first contact 60u is closed, the first zone stop 60e is engaged; if when the second contact 60u is closed, the second zone stop 60e is caught, etc.

On breaking of the contact 60u by which actuators 60p and 60r were cocked, these actuators operate. The rack 60g drops the remainder of its first step. The switch 60q disconnects actuator 60p from the control lead $C^2$ and connects it to the current source P independently thereof. Thus as element 60t passes subsequent contacts 60u the escapement is actuated for each closing and opening thereof, until this operation is terminated.

When the current pulses through the line 25e have moved the menser or senser source to such position that current is supplied for a second time to the lead $C^2$, the closing of the next circuit completing contact 60u (or contact 60z hereinafter described) again cocks actuator 60r, and the opening of this contact 60u moves switch 60q back to its initial position, disconnecting escapement actuator 60p from its independent connection to the power line P and reconnecting it to the control lead $C^2$. As no further current pulse comes down lead $C^2$, no further actuation of the actuators 60p and 60r occurs during the completion of the printing cycle.

In the form herein shown, it is preferred that the initial zone of the printer be selected by the presence of current on line $C^2$ when the first contact 60u is closed. Such current is supplied from the initial 0-position of the senser switches 32h, 33h, etc., of Fig. 4F, the initial position of the senser switches 32f, 33f, etc., in Fig. 4D, and from a contact in the initial or zero position of the indicia mensers (Fig. 4B); i. e., by the #0 contact in each case. If this contact and the next one are energized the digit "1" is set up in the recorder. Hence in Table I the corresponding numbering is employed to designate the zone and intrazone contacts setting up the printer for printing particular symbols:

TABLE 1.—PREFERRED ZONE AND INTRAZONE SYMBOL ARRANGEMENT

| Zone # and Contact 60u Selecting Same | Steps of 24b, 25b, 26b, 37, or 37b Preceding Zone Selecting Contact | Subsequent Steps Preceding Intrazone Selecting Contact | Symbol |
|---|---|---|---|
| 1 | 0 (1st contact 60u). | 1, 2, 3, 4, 5, 6, 7, 8, 9 | 1 to 9 resp. |
| 2 | 1* (2nd contact 60u). | 1, 2, 3, 4, 5, 6, 7, 8 | 0, Cr. A–F respectively. |
| 3 | 2 | 1, 2, 3, 4, 5, 6, 7 | G–M, resp. |
| 4 | 3 | 1, 2, 3, 4, 5, 6 | N–S, resp. |
| 5 | 4 | 1, 2, 3, 4, 5 | T–X resp. |
| 6 | 5 | 1, 2, 3, 4 | Y, Z and 2 special, resp. |
| 7 | 6 | 1, 2, 3 | 3 more specials, resp. |
| 8 | 7 | 1, 2 | 2 more specials, resp. |
| 9 | 8 | 1 | 1 more specials, resp. |

*0+0 also =0 print (in this case menser or senser is not stepped on second 0 contact).

As is indicated by the footnote in Table I, the numerical digit "0" (which is in the first position of the second zone, and is so attained with respect to the indicia mensers) is also attainable by double use of the zero contact associated with the switches 32f, 33f, etc. (Fig. 4D) and 32h, 33h, etc. (Fig. 4F). It will be recalled that by these switches current is supplied to the control leads $C^2$ in all live columns right at the outset. This selects the first zone, and the nine contacts associated with these switches select digits 1 to 9, respectively, therein. If none of these nine contacts is energized to stop its progress, the rack 60g (Fig. 4E), on opening of the last contact 60u descends one further step, transitorily closing switch 60z, which completes the return connection 60x from the actuators 60p, 60r to ground, after disconnecting therefrom the lead 25e to prevent any further stepping of the actuators 37 or 37b. As the switches 32f, 33f, etc., or 32h, 33h, etc., at this time rest in their initial positions, so that leads $C^2$ are energized, this action causes the restoring operation of the switch 60q concurrent with an eleventh step of the rack 60g, which positions the printing segment 60a to print a zero.

In the case of the type segment printing the CR symbol, there is no prepulse from the line 47i to the lead $C^2$ as the bail 60 closes the first contact 60u. Therefore, the escapement 60f is not released and the rack 60g does not descend the half step and become projected in front of the first zone stop 60e. In this instance, the pulse from the first side contact 47h triggers the escapement 60p and escapement relay 60r as the bale 60 closes the second contact 60u adjacent to the position 0. The impulse from the second contact 47h, Fig. 4D, then operates the escapement to advance the rack 60g and segment 60a–60d one more step in the second zone to the CR position.

As above noted the drive means 60s swings the bail 60 first counterclockwise, and then clockwise as seen in Fig. 4E. During counterclockwise motion the element 60t sequentially closes the contacts 60u. During the return movement the element 60t (which may be hinged to bail 60 as shown) does not close the contacts 60u.

Means is also provided in the printer to prevent the impressing operation, if the switch 60q has been moved from, but not restored to its initial position, as might occur in the event of a poor contact somewhere in the controlling system. In the form shown this means comprises a lead 61 extending from the power source P through a side contact of the switch 60q, a warning light 61a, and a lock-up device 61b, which may be arranged to stop the printer mechanism in any desired or conventional manner. For example, as shown print stop 61b may be a conventional circuit breaking relay opening the circuit to the printer motor 60s when lead 61 is energized, as does relay 49a, Fig. 4F.

(S) Recording operation

When it is desired to print from the mensers of any selected account, it will be appreciated that this may be accomplished simply by connecting the outputs of such mensers or their associated sensors through the connectors C to lines C², depressing the keys in the bank 25c (Fig. 4E) corresponding thereto, and closing the print-initiating contact 62 to energize relay 23c and start the motor 60s. As soon as the motor starts, holding switch 62a closes and remains closed until the printing cycle is completed when it is reopened in any suitable way.

The leads 24a, Fig. 4B, that respectively receive time spaced pulses from the account number menser 12, Fig. 4B, by connector block B, Fig. 4D, plugged into terminals C, Fig. 4F, at any suitable position, deliver the digit indicating pulses to respective leads C² to stop the printing segments 60a associated with such leads in the zone and position therein corresponding to the type faces for the particular digits of the account number.

The name and address letters and digits in the mensers 13 and 14, Fig. 4B, are similarly communicated on a time pulse basis through cabled leads 25a and 26a respectively to the connector plugs B2 and B3 respectively in Fig. 4D. These plugs being plugged into the receptacle C in any appropriate position, apply the name and address pulses of the respective letters and digits to separate leads C² arranged in the order of the letters of the name or address to control the printing segments 60a in the same manner as described for the account number.

The digits in the balance digit memories, 15 through 19, of the selected account (top of Fig. 4C) energize particular leads of the 10 lead groups 27a through 31a in the manner shown in Figs. 5 and 11. The gang switch 27c, extending across the middle of Fig. 4C, being in its central "Read" position, connects these 10-lead groups respectively through cables 27e to 31e to the true CR. Bal. switch 47e at the top of Fig. 4D, thence through the fugitive one eliminator to the equipment for converting the 1-of-10-lead outputs to 2-of-10 pulse output corresponding to the zoning arrangement in the printer. (As numerical digits are located in the first zone in the printer, the 2-of-10 pulse signal can comprise a prepulse to select the first zone, followed by an appropriately time spaced pulse to select the digit in that zone). The five leads 32g' at the bottom of Fig. 4D, and the credit symbol control lead 47i, thus each carry time spaced pulses to the terminal block B4, Fig. 4D, on the same pulse basis in which the account number, name, and address are delivered to the connector blocks B, B2 and B3. The connector block B4, being plugged in any appropriate position in the receptacle C, Fig. 4E, thus similarly controls a separate printing segment 60a for each digit of the balance, and a separate segment for printing the symbol CR when needed.

As explained in connection with Table 1 above, the 0 and CR symbols are located in the second zone and in this instance the rack 60g is given an extra step to reach the 0 position, and is given one step in the second zone to reach the CR position, as described just above.

(T) Print-punch recording means

As shown at the left-hand side of Fig. 4E, the preferred embodiment also comprises a print-punch recorder, having a bail arm 65. As the print-punch mechanism deals only with the ten numerical digits, a simplified construction is employed, and as it is desirable that the digits be simultaneously printed and punched in a 2-of-5 hole code, the print-punch impression faces 65a are considerably larger than the printing faces 60a, and are provided with punch elements 65b, carried thereby shown to the right of printing segment 65a.

In this embodiment the elements numbered 65 with various subscripts, correspond generally to the elements numbered 60 with the same subscripts in the printing device, but the zoning provisions are omitted. Thus all the print-punch segments (of which these may be any desired number) follow the bail 65, until stopped in impressing position. The first current flow through the lead C³ from any selected source connected through C', actuates the cocking stepper 65r, but not the locking relay 65p, concurrently with the closing of the first of the contacts 65u. On breaking of that contact the stepper 65r moves the switch 65q into such position that the next current flow from C³ energizes both 65p and 65r. When this second current flow is broken, as 65t moves off the corresponding contact 65u, the pawl or latch 65f is advanced and stops the print-punch segment 65g–65a in its attained position. For "zero" printing in this instance, from the 2-of-10 account number menser or the like (Fig. 4B), that menser bears a single contact only, in the "zero" or initial position. That contact produces the first current flow when the first contact 65u is closed. As there are no more contacts on the menser, the other contacts 65u produce no second current flow. But when the last of the ten contacts 65u opens, the menser steps again to its "zero" position and current is again supplied to lead C³. When no second current flow has occurred to actuate latch 65f, the print-punch segment 65a–65g follows the bail 65 past the tenth contact 65u, and the segment 66g then engages element 66g to shift single-pole double-throw contactor 66h to close the circuit from the actuators 65p, 65r, independently of the source stepping circuit 65v–26e. The switch 66h thus produces the second current flow through 65p and 65r from C³ and opening of the switch actuates the latch 65f to stop the print-punch segment in its tenth impressing position, so as to print the digit "zero." The automatic restore elements 23f'–23i' correspond to the elements 23f–23i associated with printer bail 60, the stop mechanism 66–66b corresponds to stop mechanism 61–61b, and elements 67, 67a correspond to elements 62, 62a.

When desired one or more special columns in the print-punch device, and corresponding special columns in the senser (Fig. 4F), divorced from the numerical columns therein, may be employed for special control purposes. In one such column, for example, a symbol may indicate the size of the customer's tank, for delivery scheduling purposes; another may indicate his credit limit; another, actuated by the 1–2 pulses from lead 27i (Fig. 4D) may indicate whether the punched item is a credit or debit item; i. e., a charge to be added or a payment to be subtracted, and the corresponding senser columns may actuate the "add" and "subtract" keys 27g, 28g (Fig. 4F) as above noted, to control the posting from such record.

(U) Automatic recording of active account balances

For the automatic recording of data from all active accounts, as in the taking of periodic trial balances, preparation of periodic statements, and the making of lists, summaries, and the like, use may be made of automatic selecting and printing devices similar to those used for automatic demand sensing and recording, described above.

In the form shown in Figs. 4B and 4E the same control elements 23a through 23i and 62a (or the alternatives therefor in Fig. 4E) are employed, but the leads 20m and 23i Fig. 4B, are disconnected from the demand controlled elements 20m and 23j and reconnected to the bus 51a which is energized selectively by the several active account lines 20d, by moving the switch 62b (upper left of Fig. 4B) to its right-hand position.

The active-account sequential-selector mechanism 22 of Fig. 4B is now put into operation. As soon as the first arm 11b reaches the first active account, the closing of switch 20e, Fig. 4C, energizes the lead 20n, causing the selector 22 to suspend operation, and a selected one of the recorders of Fig. 4E to record the data desired to be drawn from the mensers of that account.

In the case of demand printing, as above described, the completion of the printing operation energized lead 23i through buzzer stepper 23j which operated to rotate menser 20 to a position de-energizing lead 20m.

In the case of sequence printing of data from all active accounts, the completion of the printing operation energizes lead 23i through circuit breaker 63 (upper part of Fig. 4B), which opens the circuit 63a and thus de-energizes switch 23a–23b, and stick switch 23g, and the automatic selector 22 resumes operation to move the arms 11b until the switch 20e is closed to another active account. As above mentioned the links 20f determine which accounts are active and which are in inactive status.

(V) Computer actuation

As is shown in the lower part of Fig. 4G, the computer 70 may be of any suitable form and delivers its output to cables 54, the leads of which are energized on a 1-of-10 basis. That is, there are ten leads for the ten digits 0 to 9 in each column, one of which is energized depending on the output digit in that column. As explained above under sub-head (N), these computer outputs 54 (leading from Fig. 4G into Fig. 4F) may feed the leads 53 (Fig. 4F) to actuate the keybanks 40 to 44 of the posting mechanism and post the computer output to the mensers of a particular account, selected by the account selector as there described. Also, as shown at the bottom of Fig. 4F and described under sub-head (Q), the computer output fed to leads 53, through the 2-of-10 pulsers 32h to 36h with output through connector B6, may actuate the printing mechanism. As shown, the computer preferably is arranged with the manual key banks 71 and 72 for manual entry of items to be subjected to mathematical treatment, and with two corresponding menser controllable imputs 73 and 74, which may derive their inputs directly from the true output 1-of-10 leads and the credit balance lead in the region 32e–36e (Fig. 4D), or synchronously from the sensing switches 32f, 33f, etc. via output switching means B4 or B5, analogous to the manner above described at the ends of sections H, P and Q.

The computer may include any and all standard computer elements or elements specially designed, adaptable for use in payroll and billing machines to determine various distributions. The amounts entered through menser controlled sources 73 and 74 may be entered on the key banks 71 and 72 by actuators like the actuators 46 (Fig. 4F) described under sub-head (N) above. Plural outputs may also be included, switchable at will, to control desired groups of recording or posting columns. As such details pertain largely to the computer per se and may be varied without effecting the relationship of the computer to the other elements of the system they need no further description here.

However, by way of example, it may be mentioned that the old and well known "Marchand" calculator comprises two sets of 10-key columns (cf. 71 and 72, Fig. 4G) for receiving the multiplier and multiplicand. By magnet actuation of the keys as described in connection with magnets 46 associated with keys 40–44, upper half of Fig. 4F, the "quantity" coded on a delivery ticket may be sensed (as by sensers 53a, Fig. 4F) converted to 1-of-10 signals (as by 53b, Fig. 4F) and the selectively energized leads (as 53, Fig. 4F) may be used to selectively energize the keys of one of the banks 71 or 72 (Fig. 4G). Similarly, the 1-of-10 outputs from a menser record of unit price that appears at the region 32c–36c, Fig. 4D, may be employed to magnetically actuate keys of the other keyboard (note that the zero key in each column of this conventional keyboard does not need actuation).

In short, the arrangement is very flexible: (1) Without using the associated calculator at all, the quantities and unit prices of delivered oil may be extended manually for example, and the extensions may be entered manually on the keyboard 40–44, Fig. 4F. (2) Also without using the associated computer at all, the said extensions can be coded on the delivery ticket, and these coded amounts can then be sensed (as by senser 53a, Fig. 4F) and entered on the keyboard 40–44 by the senser outputs 53 controlling key-actuating magnets 46. (3) Assuming the computer 70 (Fig. 4G) to be an ordinary "Marchand" calculator provided with a conventional 1-of-10 electrical readout, then the quantity and unit price may be manually entered on keyboards 71 and 72, and the product, via leads 54 and 53 (Fig. 4F) may actuate the poster keyboard magnets 46 (upper half of Fig. 4F). (4) Further, with the same "Marchand" calculator with its keyboard 71 provided with 1-of-10 magnetic key-actuators (as 46, Fig. 4F), the sensed quantity, via 1-of-10 leads (as 53, Fig. 4F) can actuate keyboard 71, the unit price being entered manually on keyboard 72. (5) Finally, with the same "Marchand" calculator with both its key boards provided with magnetic actuators (as 46, Fig. 4F), not only the "quantity" may be magnetically entered as just described, but the unit price, derived from a coded card (through 1-of-10 output elements like 53a, 53b, 53, Fig. 4F) or derived from a menser record (via 1-of-10 output leads as 27e–31e, Fig. 4D, no credit balance being involved in a unit price) may also be magnetically entered on the other of keyboards 71, 72 (Fig. 4G).

In addition, calculators with electrical inputs and an electrical output each on a prepulse plus 1-of-10 sequenced pulser basis are known, being disclosed, for example, in British Patent No. 456,367. In that patent, the movement of the contact drum which carries past brushes the card punched on a 1-of-10 basis, corresponds, in its initial triggering, to the prepulse appearing on each column lead of applicants output B6 (Fig. 4F) or on applicants output B5 or B4 (Fig. 4D), and in its 1-of-10 pulse energization, to the 1-of-10 pulse energization of said connectors in applicants disclosure. Thus, the computer of the British patent may be used with the "prepulse plus 1-of-10" inputs from applicants connectors B4, B5 or B6, for accomplishing the posting by controlling via B6, the print-coder 65, Fig. 4E, for coding the product on a ticket subsequently sensed at 53a, Fig. 4F, for posting.

(W) Flexible menser

As shown diagrammatically in the upper part of Fig. 4G and in Figs. 4H through 4J, the system preferably includes means 78 controllable by the operator for registering any desired menser data on a flexible menser 78g, which may be used to control the account selecting, posting, printing or other functions.

In the form shown this means 78 includes a standard single-case keyboard in part shown at 78a, each key of which closes three contacts, one of which actuates a carriage stepper 78b while the other two actuate magnetically-controlled plungers 78c (to which they are connected, respectively, through cable 78a'), the depression of which acts against toggle-tits 78d (Fig. 4I) of pivoted toggle members 78e carried by the semi-cylindrical drum 78g to snap the toggles past retaining wires or the like 78f, and place them in projecting position. The leads to magnets 78c are arranged to tilt toggles 78e in the second and fourth positions for letter "A," the second and fifth for the letter "B," etc., or otherwise, according to the zonal and interzone arrangement employed in the printer and associated mensers, above described (see Table 1 under part R above).

In more detail, terming the first position the "zero position," the second position the "1 position," etc., in accordance with Table 1, the several keys of the single case keyboard, Fig. 4G, may close pairs of contacts to energize 2 of the 10 magnets 78c, as shown on Table 2:

TABLE 2

| Keyboard characters of keys 78a, Fig. 4G | Magnets 78c which have circuits closed by keys 78a, Fig. 4G. |
|---|---|
| 1 | #0 and #1 |
| 2 | 0 and 2 |
| 3 | 0 and 3 |
| 4 | 0 and 4 |
| 5 | 0 and 5 |
| 6 | 0 and 6 |
| 7 | 0 and 7 |
| 8 | 0 and 8 |
| 9 | 0 and 9 |
| 0 | 1 and 2 |
| Cr | 1 and 3 |
| A | 1 and 4 |
| B | 1 and 5 |
| C | 1 and 6 |
| D | 1 and 7 |
| E | 1 and 8 |
| F | 1 and 9 |
| G | 2 and 3 |
| H | 2 and 4 |
| I | 2 and 5 |
| J | 2 and 6 |
| K | 2 and 7 |
| L | 2 and 8 |
| M | 2 and 9 |
| N | 3 and 4 |
| O | 3 and 5 |
| P | 3 and 6 |
| Q | 3 and 7 |
| R | 3 and 8 |
| S | 3 and 9 |
| T | 4 and 5 |
| U | 4 and 6 |
| V | 4 and 7 |
| W | 4 and 8 |
| X | 4 and 9 |
| Y | 5 and 6 |
| Z | 5 and 7 |
| ; | 5 and 8 |
| Special | 5 and 9 |
| Do | 6 and 7 |
| Do | 6 and 8 |
| Do | 6 and 9 |
| Do | 7 and 8 |
| Do | 7 and 9 |
| Space | 8 and 9 |

This exemplary arrangement is in part illustrated in Fig. 4G, where the "A" character key 78a is shown to energize the first and fourth of the magnets 78c; the "S" character key 78a is shown energizing the third and ninth of the 10 magnets 78c, etc., the ";" key, typifying a "special" symbol, energizing the fifth and eighth of the magnets 78c per Table 2, if this symbol is so located in the printer at the right of Fig. 4F.

The toggle members 78e are arranged in peripheral groups of ten about a drum body 78g (half-cylindrical in the form shown, there being at least as many peripheral groups longitudinally spaced along the body as there are to be columns or spaces in the longest name, address or other item to be recorded.

Thus as the keys 78a and space bar 78h are depressed, the carriage 78i is stepped along and carries the magnetic actuators 78c into alignment with the respective groups of toggle elements.

Current is supplied to the flexible menser device through a power switch 78j. Backspacing may be effected by the switch 78q controlling carriage reverse stepper 78r, and carriage-return by a buzzer actuator 78s controlling the same device, and provided with a limit switch of any suitable design (not shown).

The control or driving lead 78k with its cocking relay 78m are associated with the printer or print-punch device, at will, through the key bank 25c (Fig. 4E), and the menser output 78n may be correspondingly associated with the recorder input C or C', or the corresponding input 80 of the menser-setter (Fig. 8). Thus the drum 78g is arranged to be stepped synchronously with the device to be controlled by the output 78n.

As the drum 78g is rotated, the projected toggles 78e close contacts 78p (see Fig. 4J), one of which is associated with each column, to send pulses of current for each column to the controlled device to set up the desired condition therein.

When this operation is completed, the direction of rotation of the drum may be reversed, manually as by the crank 78u, or otherwise, and a clearing bar 78v (Fig. 4H, omitted in Fig. 4G) may be depressed, so that return rotation of the drum will depress all the toggles 78e.

It will be noted that in the embodiment referred to in Tables 1 and 2, the first of the two toggles set lies in one of the positions from "0" to "8," the second simultaneously set being located in any one of the positions following that one. Thus in this embodiment the combination 8–9 is the last one used. And since the "space" between words is a special character, that character like the ";", period, etc., may be arbitrarily located at any one of the "special" positions 5–8 through 8–9, Table 2 (so long as it is similarly located in the type segments in the printer at the right in Fig. 4F). It is convenient, however, to locate the "space" in the last of the special positions, as shown in Table 2, in which instance, of course, the space bar or its equivalent will close the circuits of magnets 78c in the 8 and 9 positions, just as a letter or special character key 78a closes the contacts of its appropriately located pair of magnets 78c, all per Table 2 in the illustrative embodiment.

(X) Indicia mensers

While various forms of indicia mensers may be used, these mensers are preferably arranged to be adjustable, and a desired form thereof is shown in Figs. 6 and 7, together with means for adjusting the same (Fig. 8).

In this form the menser body 12 is formed from ten-tooth pinion wire (which is a wire of appropriate metal extruded in the cross section of a ten toothed pinion) by reducing the ends to form axles, reducing the tooth height except at the gear section 80d (Fig. 6) and then further peripherally grooving the reduced section to receive adjustable contacts 80a in pairs. These contacts may be formed of spring wire and embrace the grooves as shown in Fig. 7, and have detent-like tips entering the residual tooth spaces to hold them in adjusted position.

As is shown in Fig. 8, the two members of each pair of contacts 80a are initially positioned in the "0" and "1" locations, and the menser 12 is mounted for rotation about its axis with these contacts 80a in abutting relation to two tines 80b of a pivoted arm 80c actuable by a magnetic device 80d, under control of the current output 78n (Fig. 4G) connected to the input terminals 80 (Fig. 8).

As the menser 12 is rotated step by step in synchrony with the rotation of the flexible menser drum 78g, the first pulse of current allows the contacts 80a to escape from the adjacent tines 80b. The leading contact 80a is thus released in its attained position, but the lagging contact 80a is picked up by the second tine and moved by it until released in attained position by the second current pulse.

Thus concurrently with the operation of the printing or otherwise, the flexible menser may be employed to set up a permanent indicia menser 12, 13 or 14 for opening of a new account, change of address, or other function, ready for insertion in the appropriate location in the menser bank 10k (Figs. 1 and 4).

(Y) Preferred cumulator mensers

The "degree-day" account balance, and any other mensers cumulating numerical data on a 1-of-10 basis, as exemplified at the top of Fig. 5 and at 20 (top of Fig. 4B), may be similarly formed of ten-tooth pinion wire or the like with the teeth eliminated in the body portion except where sections thereof are left to constitute the ten longitudinally- and circumferentially-spaced contact elements. The preferred form thereof is best shown in Fig. 5, and special variations thereof adapting the same for adjustable demand limit control and for controlling debit and credit amounts, are diagrammatically indicated in connection with menser 20, Fig. 4B, and menser 47, Fig. 4C, and have been previously described.

(Z) Trolley bus connecting

While various modes may be employed for associating the reading and controlling busses so that they may be energized through the menser contacts of the various mensers, the trolley bus arrangement exemplified in Figs. 5 and 11 is highly desirable, as it simplifies the assembly and servicing of the equipment and eliminates the large multiplicity of paired contacts, soldered connections, etc., which are required by most other forms of switching means.

In accordance with the trolley bussing system, Figs. 5 and 11 each menser-selecting idler 90b (20b in Fig. 4B) is provided with an axial extension 90c, and carries mutually insulated trolley contact elements 90d. If the idler body 90b–90c is formed of insulating material, the contact trolley elements with interposed insulating disks 90g, may be keyed or otherwise secured directly thereto for example as by insulating key 90r. When associated with a menser 90 (20 in Fig. 4B) having ten longitudinally-displaced, spirally-arranged contacts, each idler 90b–90c will carry ten trolley-contacts 90d, and each of the ten trolley-contacts 90d has engaging its groove one of the ten menser reading busses collectively designated 90e in Figs. 4A and 5 (these busses being designated at 24a–25a, etc. to 31a, and at 20m, 47a and 48a in Figs. 4B and 4C). These busses, as well shown in Figs. 4A and 5, extend over arcuate backing-up shields 90f of insulating material and over insulating guide rolls 90g, either or both of which may be grooved to maintain mutual spacing between the trolley wire busses.

Some or all of the guide rolls 90g may be spring-tensioned as shown at 90h (Fig. 5) to maintain a gentle tension on the trolley busses 90e and prevent any of them from slacking off. At one or more locations 90g, individual tensioning rolls may be provided for each of the trolley wires 90e to compensate for any differences in initial installation or temperature co-efficient of expansion thereof.

While contact may be established directly from the trolley busses 90e to the contacts of the menser 90, in the preferred form shown these contacts are esablished by the toothed rim-flange of the trolley contacts 90d, which roll into contacting relation with the menser contacts as the idler 90b rolls by the menser, or as the idler and menser are rotated in engagement with each other.

To provide for ready replacement of worn or obsolete mensers and to compensate for wear between the parts, as shown at the top of Fig. 5 the mensers 90 are preferably removably mounted and their bearings are spring-biased to urge them inwardly toward the shield 90f to a position very slightly inward of close rolling contact with the trolley-contacts 90d. In the form shown in Fig. 5, the account bus 20d (see also Fig. 4C) is formed as a Phosphor bronze strip having strike-outs 90m bent downwardly to springingly receive the menser elements 90 of a particular account, and to simultaneously render the mounting thereof radially yieldable, the strips 20d being mounted on insulating elements 90n. Because the mensers and the trolley-contacts roll in mesh with each other, there is no tendency for the successive contacts, even of the adjustable mensers (Figs. 6–8) to be displaced in either the account-selecting or the account-reading operation.

As previously described in connection with element 20c, Fig. 4B, the idlers 90b roll in the internal orbit gear 90i having the same radius as the arc-radius to the end gears of the mensers 90 of the arcs 10k (Fig. 4B). Thus rotation of the selector shaft and arms 11a, 11 b, produces no rotation of the mensers 90, but when the orbit gear 90i is rotated in one direction or the other by the steppers collectively designated 90j and 90k in Fig. 5 (individually shown at 20i, 24b to 31b, and 47k, Figs. 4B and 4C), the idler 90b and the mensers engaged thereby are turned. The steppers as hereinbefore noted, are preferably solenoid or magnet actuated pawl and ratchet devices of the cocking type, and each pair of them is arranged to step the gear 90i in either direction, selectively.

As shown in Fig. 9 the same arrangement may be used with the debit limit and credit balance indicating menser 47 (Fig. 4C). The absence of any tooth in the 0-position of this menser allows the idler-carried trolley-contact 90d to rotate without contact with the menser in this position. When the menser 47 is in #1 position (debit balance overrun) one of the two trolley-contacts 90d engages the #1 contact, energizing the lead 48a. When the menser 47 is turned to #9 position (credit balance) the other of the two trolley-contacts 90d will mesh therewith and the other, credit balance lead 47a will be energized.

SUMMARY OF OPERATION

From the foregoing description it will be apparent that a system and apparatus are herein disclosed by which the named objects and other advantages of the invention may be obtained.

In the monitoring of an oil delivery business, selected by way of example, the several customers' and ledger account data and balances are all permanently, though changeably, retained in the machine, in contradistinction to the separation thereof in many separate instrumentalities as previously practiced.

The posting to all active accounts of "degree-day" cumulations or the like, is effected, merely by depressing the keys 21a (bottom left of Fig. 4B), at a rate equivalent to about 5000 accounts per minute.

The preparation of delivery tickets for all accounts requiring delivery, is effected merely by connecting the appropriate menser leads to the printing mechanism (or preferably the printing and card coding mechanism) and closing the key 22a (bottom right of Fig. 4B). The demand sensing system 22, Fig. 4B, then scans each account in sequence, stopping at each one which requires delivery only just long enough to prepare the delivery ticket (preferably automatically by the means exemplified in Fig. 4E), and then proceeding with the scanning operation.

The delivery tickets are preferably coded with the quantity delivered, by the drivers. On their return, the coded tickets are preferably run through senser means (as those associated with Figs. 4E and 4F). The sensed identifying data (as described under "Delivery Procedure" above) may operate the account selector of Fig. 4A to select the proper account or accounts to be posted, and may at the same time operate a printer (Fig. 4E) for the daily journal or for any special purpose. The "quantity" figures, applied to the ticket by the driver, are fed to the computer 70 (Fig. 4G) and extended thereby. The extended figures output from the computer 70, as above described, may be connected by plug-block or other means, to print the extensions in the daily journal and on the duplicate tickets, and to post them, through the posting means (upper half of Fig. 4F) to the proper accounts.

Prospective account overruns, as noted, prevent the posting operation and signal the operator so that proper note may be made of the status of any account not conforming to the limits set up in the machine.

Trial balances may be taken off the machine from all the account mensers or from code-selected group-total mensers, as "Accounts Receivable Total," "Accounts Payable Total," "Drivers' Accounts Total," etc., which, as noted, may be posted when the individual accounts are being posted from delivery tickets or cash tickets.

At the end of the billing period, the printing apparatus of Fig. 4E, acting with the account sensing means of Fig. 4B, may automatically prepare, from the data held in the machine, statements of balance due (and if desired, duplicates for the ensuing period showing the same figure as "old balance"), for delivery to the customer with the duplicate delivery and cash tickets, to constitute his bill.

In its several accounting and billing operations, it will be observed that the machine (by virtue of provisions exemplified in Figs. 4C and 4D) automatically prints true credit balances from menser retained complements, automatically eliminates the "fugitive-one," automatically prints "right zeros" and "zero balances," and automatically calls attention to accounts whose credit limit or the like has been exceeded.

The several instrumentalities incorporated in the apparatus may take various forms as will be apparent to those skilled in the art. Where unconventional devices are employed (as in the "memory" or "menser" bank, the synchronized printer, the "pre-carry" and "pre-borrow" poster systems, the various safety lockups, the manually controlled "flexible" or "temporary" memory, Figs. 4G and 4H, etc.) exemplary forms thereof are set forth for completeness of disclosure, with the understanding that while such forms are new and patentable, per se, they are but illustrative as regards the more general combinations.

In conclusion, therefore, it is to be understood that the several features and combinations of the invention may be embodied in specific forms other than those illustrated without departing from the principles or essential characteristics thereof. The embodiments shown are accordingly to be considered as illustrative and not restrictive, the scope of the invention being defined by the appended claims. All modifications and changes which come within the meaning and range of equivalency of the claims are therefore intended to be included therein.

I claim as my invention:

1. A continuous record business machine comprising registering mensers for each of a multiplicity of accounts, said mensers for each account comprising account-identifying mensers and balance digit mensers; said machine comprising a source of electrical power; a control keyboard, menser-controlling busses, and menser reading busses connected to be energized from said source; and said machine further comprising remote control selector means operable from said keyboard for coupling said controlling and reading busses to the mensers of any selected account, means controllable from said keyboard by way of said menser controlling busses for directly altering the registration of the balance digit mensers of the selected acount to change the balance digits registered therein; and means controllable from said keyboard by way of said account-reading busses for recording at a location remote from the registering mensers the data including account identifying data registered in selected account mensers of the selected account directly therefrom.

2. A business machine according to claim 1, in which the mensers of each of a multiplicity of the accounts comprise at least one menser registering control data, said machine comprising means the operation of which is initiable from said keyboard for automatically and sequentially altering the data registered in the control mensers of a multiplicity of the accounts.

3. A business machine according to claim 1, in which the mensers of said multiplicity of accounts comprise at least one menser registering control data, said machine comprising means the operation of which is initiable from said keyboard for automatically and simultaneously altering the data registered in the control mensers of a multiplicity of the accounts.

4. A business machine according to claim 1, in which the mensers of each of a multiplicity of accounts comprise at least one menser registering control data, said machine comprising means the operation of which is initiable from said keyboard for automatically and simultaneously altering the data registered in the control mensers of groups of the accounts sequentially by groups thereof.

5. A business machine according to claim 1, in which said selectively coupled busses include at least one bus responsive to a capacity limit of the balance digit mensers, a posting mechanism operable to stop a posting operation if said operation would alter the highest column value registered in the mensers, and indicating means correlated with said posting mechanism to indicate whether completion of the posting would exceed the capacity limit of the said balance digit mensers.

6. A business machine according to claim 1, in which said selectively coupled busses include at least one bus responsive to the registration of digits of a complement in the balance digit mensers of a selected account, and in which said recording means comprises a converter controlled by said complement responsive bus for recording from the registered complement the true balance corresponding thereto.

7. A business machine according to claim 1, in which the mensers each of a multiplicity of accounts comprise at least one menser registering control data, means for automatically coupling said busses sequentially to a multiplicity of accounts, and means for interrupting the coupling sequence and recording data registered by the account-identifying mensers of an account, selectively actuated in response to the registration of appropriate data in the control mensers of said accounts.

8. A business monitoring and accounting machine for controlling a fuel delivery business or the like, comprising mensers for each of a multiplicity of accounts, said mensers for each account comprising account-identifying mensers and a consumption estimating menser; a source of electrical power; a control keyboard, menser controlling busses connected to be energized from said source and menser reading busses, remote-controlled coupling means operable from said keyboard for coupling said busses to the mensers of particular accounts, means operable from said keyboard through certain of said control busses for directly changing the registration of the control mensers of a multiplicity of accounts to reflect a further unit of consumption therein, means operable from said keyboard to sequentially couple the busses to each of the multiplicity of accounts, and means for interrupting the coupling sequence and printing on a delivery ticket the identifying data of an account selectively actuated in response to the registration of consumption equal to a predetermined consumption limit in the control menser of particular accounts.

9. A business machine according to claim 1, in which the mensers of each account each comprise an elongated rotatable rod-like element having data-indicating elements arranged in circumferentially- and longitudinally-spaced relation thereon.

10. A business machine according to claim 1, in which the mensers of each account are aligned along a common axis and each comprise an elongated rotatable rod-like element having data indicating elements arranged in circumferentially- and longitudinally-spaced relation thereon.

11. A business machine according to claim 10, in which the aligned mensers of the several accounts are arranged in parallel relation to form groups each comprising the mensers of a number of accounts, and in which the controlling and reading busses are coupled to the mensers of a particular account in a particular group by selector elements to all the accounts of the particular group.

12. A business machine according to claim 10, in which the aligned mensers of the several accounts are arranged in parallel relation to form groups each comprising the mensers of a number of accounts, and in which the respective mensers are rotated by idler means arranged to couple the mensers of any given one of the accounts in a group to menser rotating means common to the group in which the mensers of said given account are located.

13. A business machine according to claim 10, in which the aligned mensers of the several accounts are arranged in parallel relation to form groups each comprising the mensers of a number of accounts, and in which the menser controlling busses include a power bus, and in which said power bus is coupled to the mensers of a particular account in a particular group by coupling means common to all the mensers of the particular group.

14. A business machine according to claim 9, said mensers each having ten circumferential indicating positions and some of said mensers having two circumferentially-spaced indicating elements in the same longitudinal zone thereof, said recording means interpreting said "2 of 10" menser indications directly, and comprising means for deriving, from the mensers having only one circumferential indicating position in each longitudinal zone, equivalent "2 of 10" indications for operating said recording means.

15. A business machine according to claim 14, said machine further comprising a senser for sensing punched records in which different digits are indicated by punchings in two of five predetermined positions, said senser system comprising means for converting the sensed "2 of 5" indications into equivalent "1 of 10" indications, and means for deriving from said "1 of 10" indications equivalent "2 of 10" indications for operating said recording means.

16. A business machine comprising registering mensers for identifying and registering the balances of each of a multiplicity of accounts, a source of power and busses connected to be energized therefrom for performing accounting operations with the several accounts, a keyboard, and means controllable from the keyboard for associating the busses with selected ones of the multiplicity of accounts, said last named means including means controllable from the keyboard for posting debits and credits to selected accounts by directly altering the values registered in the balance mensers therein, and means for printing statements and other accounting records directly from the data stored in the mensers of any selected account.

17. A business machine according to claim 1, said account-identifying mensers comprising name and address registering mensers of elongated rod-like form longitudinally divided into zones corresponding to the characters of the name and address, each zone having a plurality of circumferential positions therein, and each character being represented by two elements located in selected ones of said circumferential positions.

18. A business machine according to claim 17, said indicating elements being movable to different circumferential positions in their zones to change the names and addresses registered thereby.

19. A business machine comprising electrically controlled registering means for each of a multiplicity of accounts, each registering means comprising account identity registering elements and alterable account balance registering elements, a common electrically controlled posting means, a common electrically controlled translating means, and electrically operated means controllable by an operator for selecting any particular account, for electrically connecting its balance registering elements selectively to said posting and translating means, and for connecting its identity registering elements to said translating means said posting means operating to alter said balance registering means, and said translating means being operable directly by the account identity and balance registering means of an account selected by said selecting means.

20. A business machine according to claim 19, in which said translating means comprises an electrically actuated printer, and controlling means therefore actuable directly by the registering elements of the one of the multiplicity of account registering means selected by said operator-controllable means, for printing the account identifying and account balance data registered therein.

21. A business machine according to claim 19, in which said translating means comprises an electrically actuated coding device and controlling means therefor actuable directly by the registering elements of the one of the multiplicity of account registering means selected by said operator controllable means, for reproducing in code data registered therein.

22. A business machine comprising electrically controlled registering means for each of a multiplicity of items, each registering means comprising item identity registering elements, a common electrically controlled translating means, and electrically operated means controllable for selecting any particular item, for connecting the registering means for said item to said common translating means, and for operating said translating means directly in response to the item identity data registered in said registering means, to translate said data for further use.

23. In a business machine, an amount balance register, a posting means for receiving an amount to be algebraically added to said register, means controlled by the entries in said register and said posting means for pre-determining the carries required for the particular posting, and means for preventing the posting operation if said posting would cause the amount to be registered on the balance register to lie outside its capacity range.

24. In a business machine, an amount balance register, a posting means for receiving an amount to be added to said register, means controlled by the entries in said register and said posting means for pre-determining the carries required for the particular posting, and means for posting said carries to said register prior to the posting thereto of the digits entered in said posting means.

25. In a business machine, an amount balance register capable of registering credit balances in the form of complements, electrically controlled translating means responsive to the balance registered in said register, and switching means responsive to the presence of a complement balance in said register for rearranging the control circuits of said translating means to cause the latter to derive from said complements the true "credit balance" reflected thereby.

References Cited in the file of this patent

UNITED STATES PATENTS

| Number | Name | Date |
|---|---|---|
| 1,157,625 | Heuser | Oct. 19, 1915 |
| 1,169,078 | Heuser | Jan. 18, 1916 |
| 1,175,059 | Heuser | Mar. 14, 1916 |
| 1,186,469 | Crumpton | June 6, 1916 |
| 1,340,435 | Bryce | May 18, 1920 |
| 2,005,807 | Smith | June 25, 1935 |
| 2,035,590 | Campos | Mar. 31, 1936 |
| 2,099,754 | Robinson | Nov. 23, 1937 |
| 2,358,154 | Fettig | Sept. 12, 1944 |
| 2,364,540 | Luhn | Dec. 5, 1944 |
| 2,432,324 | May | Dec. 9, 1947 |
| 2,486,809 | Stibitz | Nov. 1, 1949 |
| 2,535,218 | Marble | Dec. 26, 1950 |

FOREIGN PATENTS

| Number | Country | Date |
|---|---|---|
| 270,044 | Great Britain | May 6, 1927 |